US012646012B2

(12) United States Patent
Zhao et al.

(10) Patent No.: US 12,646,012 B2
(45) Date of Patent: Jun. 2, 2026

(54) VEGETATION MANAGEMENT SYSTEM AND VEGETATION MANAGEMENT METHOD

(71) Applicant: Hitachi Energy Ltd, Zürich (CH)

(72) Inventors: Yu Zhao, Tokyo (JP); Tomonori Yamamoto, Tokyo (JP)

(73) Assignee: HITACHI ENERGY LTD, Zürich (CH)

( * ) Notice: Subject to any disclaimer, the term of this patent is extended or adjusted under 35 U.S.C. 154(b) by 430 days.

(21) Appl. No.: 18/014,631

(22) PCT Filed: Jun. 29, 2021

(86) PCT No.: PCT/JP2021/024597

§ 371 (c)(1),
(2) Date: Jan. 5, 2023

(87) PCT Pub. No.: WO2022/009739

PCT Pub. Date: Jan. 13, 2022

(65) Prior Publication Data

US 2023/0274197 A1 Aug. 31, 2023

(30) Foreign Application Priority Data

Jul. 6, 2020 (JP) ................................. 2020-116326

(51) Int. Cl.
*G06T 7/70* (2017.01)
*G01C 11/00* (2006.01)
(Continued)

(52) U.S. Cl.
CPC ............. *G06Q 10/00* (2013.01); *G01C 11/00* (2013.01); *G06T 7/70* (2017.01); *G06V 20/188* (2022.01); *G06T 2207/10032* (2013.01)

(58) Field of Classification Search
CPC ........ G06V 20/188; G06V 20/64; G06T 7/70; G06T 7/0016; G06T 2207/10032;
(Continued)

(56) References Cited

U.S. PATENT DOCUMENTS

2010/0198775 A1* 8/2010 Rousselle ............ A01B 79/005
706/54
2014/0093138 A1 4/2014 Naganuma et al.
(Continued)

FOREIGN PATENT DOCUMENTS

AU 2010340073 A1 7/2012
CA 2960095 A1 3/2016
(Continued)

OTHER PUBLICATIONS

Extended European Search Report for EP App No. 21838857.7 dated Jul. 10, 2024, 9 pgs.

*Primary Examiner* — Tracy Mangialaschi
(74) *Attorney, Agent, or Firm* — PROCOPIO, CORY, HARGREAVES & SAVITCH LLP

(57) ABSTRACT

Vegetation management system includes: a data acquisition unit that acquires input data including remote sensing data obtained by photographing, by remote sensing, a facility and vegetation to be analyzed; a vegetation classification unit that classifies the vegetation photographed in the remote sensing data; a wide-area growth prediction unit that predicts a time-series change of a growth range of the vegetation photographed in the remote sensing data; a vegetation amount simulation unit that predicts a fluctuation in the growth amount of each vegetation by a simulation; a three-dimensional construction unit that constructs a three-dimensional model expressing the facility and the vegetation; and
(Continued)

a risk determination unit that determines a contact risk indicating a contact possibility between the facility and the vegetation.

20 Claims, 20 Drawing Sheets

(51) Int. Cl.
  *G06Q 10/00* (2023.01)
  *G06V 20/10* (2022.01)

(58) Field of Classification Search
  CPC . G06T 2207/10024; G06T 2207/30188; G06T 2207/10048; G01C 11/00; G06Q 10/00; G06Q 10/04; G06Q 10/0635; G06Q 50/06; G16Y 10/35; G16Y 40/20; G16Y 40/40; H02G 1/02; Y04S 10/50
  See application file for complete search history.

(56) References Cited

U.S. PATENT DOCUMENTS

| | | | | |
|---|---|---|---|---|
| 2017/0277953 A1* | 9/2017 | Stanley | ................ | G06V 20/176 |
| 2018/0098137 A1 | 4/2018 | Saha et al. | | |

FOREIGN PATENT DOCUMENTS

| | | | | |
|---|---|---|---|---|
| CN | 102725605 A | | 10/2012 |
| JP | 2011-10479 A | | 1/2011 |
| JP | 2016123369 A | * | 7/2016 |
| JP | 2020101543 A | | 7/2020 |
| WO | 2013/002349 A1 | | 1/2013 |
| WO | 2019/226782 A1 | | 11/2019 |

* cited by examiner (A)

211

PRE-CLASSIFICATION MAP IMAGE
(ORIGINAL IMAGE)

(B)

212

VEGETATION CLASSIFICATION MAP
IMAGE

VEGETATION MANAGEMENT SYSTEM AND VEGETATION MANAGEMENT METHOD

CROSS-REFERENCE TO RELATED APPLICATIONS

The present application is a national stage entry of International Patent App. No. PCT/JP2021/024597, filed on Jun. 29, 2021, which claims priority to Japanese Patent App. No. 2020-116326, filed on Jul. 6, 2020, which are both hereby incorporated herein by reference as if set forth in full.

TECHNICAL FIELD

The present invention relates to a vegetation management system and a vegetation management method and is suitable for application to a vegetation management system and a vegetation management method that support maintenance work of a power facility regarding contact with vegetation with use of measurement information of remote sensing.

BACKGROUND ART

In power facility maintenance work of the related art, routes in which power facilities such as power distribution lines and power transmission lines are disposed have been manually examined on a periodic basis, and works of removing tree branches, using herbicide, and the like have been performed in places where a problem of trees coming into contact with the power facilities, for example, may occur. Meanwhile, in recent years, efforts are being made to automate the examination work due to labor shortage and the like.

In those efforts to automate the examination work, a remote sensing technology that can remotely monitor power facilities and trees (vegetation) is gathering attention in view of the fact that many of the power facilities such as power distribution lines and power transmission lines are installed in places that are difficult for people to enter such as mountainous regions. As representative means of the remote sensing technology, artificial satellites, aircrafts, drones, and the like are used. As a method of determining the contact between the vegetation and the facility, research and development of vegetation contact determination by three-dimensional measurement utilizing a light detection and ranging (LiDAR) sensor are being carried out.

For example, in PTL 1, a system of analyzing the growth of plants on the basis of a remote sensing image photographed by the remote sensing technology is disclosed.

CITATION LIST

Patent Literature

PTL 1: Japanese Patent Laying-Open No. 2016-123369

SUMMARY OF INVENTION

Technical Problem

However, in the related-art technology, there has been a problem in that vegetation contact determination by three-dimensional measurement utilizing a remote sensing sensor such as a LiDAR sensor needs to be performed when the contact between the facility and the vegetation is analyzed utilizing the remote sensing data, and it becomes extremely costly when the photographing range becomes wide or the photographing period becomes frequent in order to perform accurate determination. In order to support intuitiveness of operation and visualization for a user, it is an essential process to cause the facility and the vegetation to be three-dimensional, and the necessity of a large amount of heterogeneous geographical information in time series therefor has also been a cause of cost increase.

The present invention has been made in view of the points above and proposes a vegetation management system and a vegetation management method capable of suppressing the increase in cost and accurately analyzing a risk of vegetation and a facility coming into contact with each other.

Solution to Problem

In order to solve the problems above, in the present invention, a following vegetation management system that analyzes, with use of remote sensing data obtained by photographing a facility and a vegetation to be analyzed by remote sensing, a contact of the vegetation with respect to the facility is provided. The vegetation management system includes: a data acquisition unit that acquires input data including at least the remote sensing data, geographical data of the facility, and environmental data relating to a growth of the vegetation; a vegetation classification unit that classifies the vegetation photographed in the remote sensing data; a wide-area growth prediction unit that predicts a time-series change of a growth range of the vegetation photographed in the remote sensing data; a vegetation amount simulation unit that predicts, by a simulation, a fluctuation in a growth amount of each vegetation classified by the vegetation classification unit; a three-dimensional construction unit that constructs a three-dimensional model expressing the facility and the vegetation on the basis of the remote sensing data and the geographical data; and a risk determination unit that determines a contact risk indicating a contact possibility between the facility and the vegetation on the basis of a processing result obtained by the wide-area growth prediction unit, the vegetation amount simulation unit, and the three-dimensional construction unit.

In order to solve the problems above, in the present invention, a following vegetation management method by a vegetation management system that analyzes, with use of remote sensing data obtained by photographing a facility and a vegetation to be analyzed by remote sensing, a contact of the vegetation with respect to the facility is provided. The vegetation management method includes: a data acquisition step of acquiring input data including at least the remote sensing data, geographical data of the facility, and environmental data relating to a growth of the vegetation; a vegetation classification step of classifying the vegetation photographed in the remote sensing data; a wide-area growth prediction step of predicting a time-series change of a growth range of the vegetation photographed in the remote sensing data; a vegetation amount simulation step of predicting, by a simulation, a fluctuation in a growth amount of each vegetation classified in the vegetation classification step; a three-dimensional construction step of constructing a three-dimensional model expressing the facility and the vegetation on the basis of the remote sensing data and the geographical data; and a risk determination step of determining a contact risk indicating a contact possibility between the facility and the vegetation on the basis of a processing result obtained in the wide-area growth prediction step, the vegetation amount simulation step, and the three-dimensional construction step.

Advantageous Effects of Invention

According to the present invention, it becomes possible to suppress the increase in cost and accurately analyze the risk of the vegetation and the facility coming into contact with each other.

DESCRIPTION OF EMBODIMENTS

With reference to the drawings, one embodiment of the present invention is described in detail below.

Figure 1:
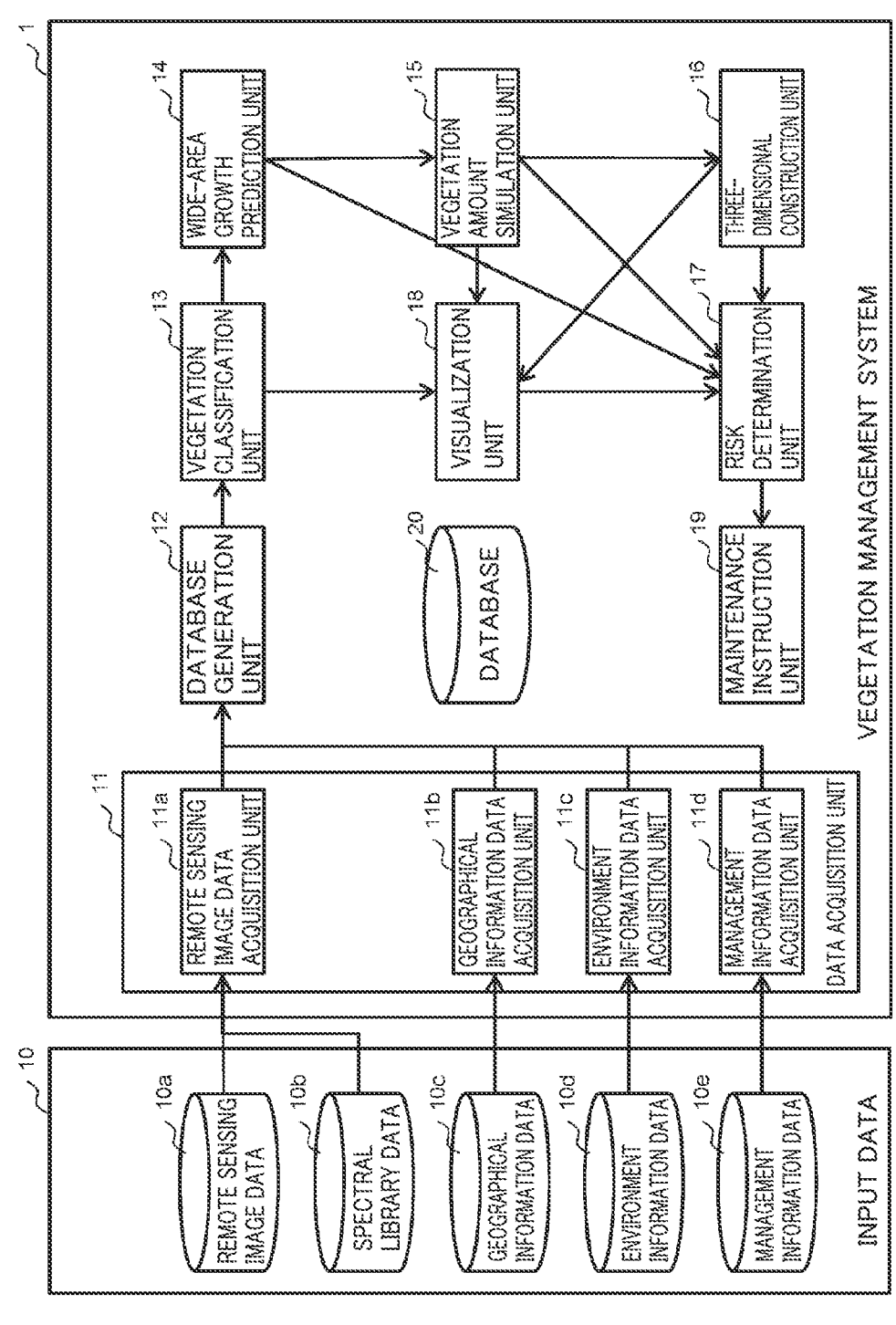
FIG. 1 is a block diagram illustrating a configuration example of a vegetation management system 1 according to one embodiment of the present invention.

FIG. 1 is a block diagram illustrating a configuration example of a vegetation management system 1 according to one embodiment of the present invention. Vegetation management system 1 according to this embodiment is a system that analyzes a contact risk between vegetation and a power facility with use of remote sensing data for a region to be analyzed (target region) designated by a user. As illustrated in FIG. 1, vegetation management system 1 is a system to which a plurality of pieces of heterogeneous input data 10 (specifically, remote sensing image data 10a, spectral library data 10b, geographical information data 10c, environment information data 10d, and management information data 10e) are input. Vegetation management system 1 includes data acquisition units 11 (individually, a remote sensing image data acquisition unit 11a, a geographical information data acquisition unit 11b, an environment information data acquisition unit 11c, and a management information data acquisition unit 11d), a database generation unit 12, a vegetation classification unit 13, a wide-area growth prediction unit 14, a vegetation amount simulation unit 15, a three-dimensional construction unit 16, a risk determination unit 17, a visualization unit 18, a maintenance instruction unit 19, and a database 20. Details of each unit is described, as appropriate, in the description below. In FIG. 1, the movement of data and the transition of processing are indicated by directional solid lines. However, database 20 is accessed from substantially all configurations, and hence indications of arrows are omitted.

Individual data configuring input data 10 is described.

Remote sensing image data 10a is image data in time series obtained by observing the ground surface by a remote sensing sensor and is specifically a satellite photograph or an aerial photograph, for example, obtained by RapidEye, LANDSAT, Sentinel, and the like. As remote sensing image data 10a, for example, low-resolution remote sensing images and high-resolution remote sensing images in time series can be used. However, in this embodiment, the type of data of remote sensing image data 10a is not limited to the above, and time-series images in the same remote sensing images may be used, for example. In this description, whether the resolution is high or low is not based on an absolute standard and is based on a relative comparison.

Spectral library data 10b is data of a spectral library obtained by observing the vegetation by an optical sensor (in particular, a passive sensor that obtains information by light from an object (the vegetation in this example)). The passive sensor basically has a structure and a function similar to those of an eye (naked eye). In detail, in the passive sensor, an optical system (equivalent to the lens of an eye) such as a lens collects light from an object, forms an image on a detection system (equivalent to the retina of the eye), and obtains spectra and spatial information (for example, color and shape). In particular, regarding spectra (color), while the eye catches only visible light rays, the optical sensor can detect a wide wavelength range from visible light rays to infrared rays and hence can obtain a lot of beneficial information such as identification of minerals, rocks, and vegetation, the temperature of the ground surface, the usage situation of the land, water resources and plankton resources of the sea and lakes and marshes, and the like that cannot be read by an eye. The optical sensor can also obtain the beneficial information as above as a two-dimensional picture across a wide area.

Geographical information data 10c is data of geographical information provided from a geographical information system (GIS) and includes information on positions and shapes (for example, polygons) relating to the power facility (a power distribution line, a power transmission line, and the like) and the vegetation. Geographical information data 10c is data necessary when data acquired on site and data acquired from a satellite, an aircraft, and the like are shared in vegetation management system 1.

Environment information data 10d is data relating to on-site environment and is data relating to the soil, the ecosphere, the air temperature, the weather, and the like in the region to be analyzed, for example. Examples of specific weather data include data of AMeDAS, ground surface temperature data of the Moderate Resolution Imaging Spectroradiometer (MODIS), and weather bureau data.

Management information data 10e is data necessary for specifying the content of the maintenance instruction by maintenance instruction unit 19 and can include a history of the maintenance work (maintenance history), places (maintenance places) where the maintenance work has been performed, and staff and equipment (staff/equipment) needed for the maintenance work, for example. Positions of offices and equipment storages, information on the staff and equipment, and the like referred to when the maintenance instruction content is specified in maintenance instruction processing described later are also included in management information data 10e. The provider of management information data 10e is an electric power company, for example, and operational data such as an operation maintenance memo, a log, and a history can be used.

Figure 2:
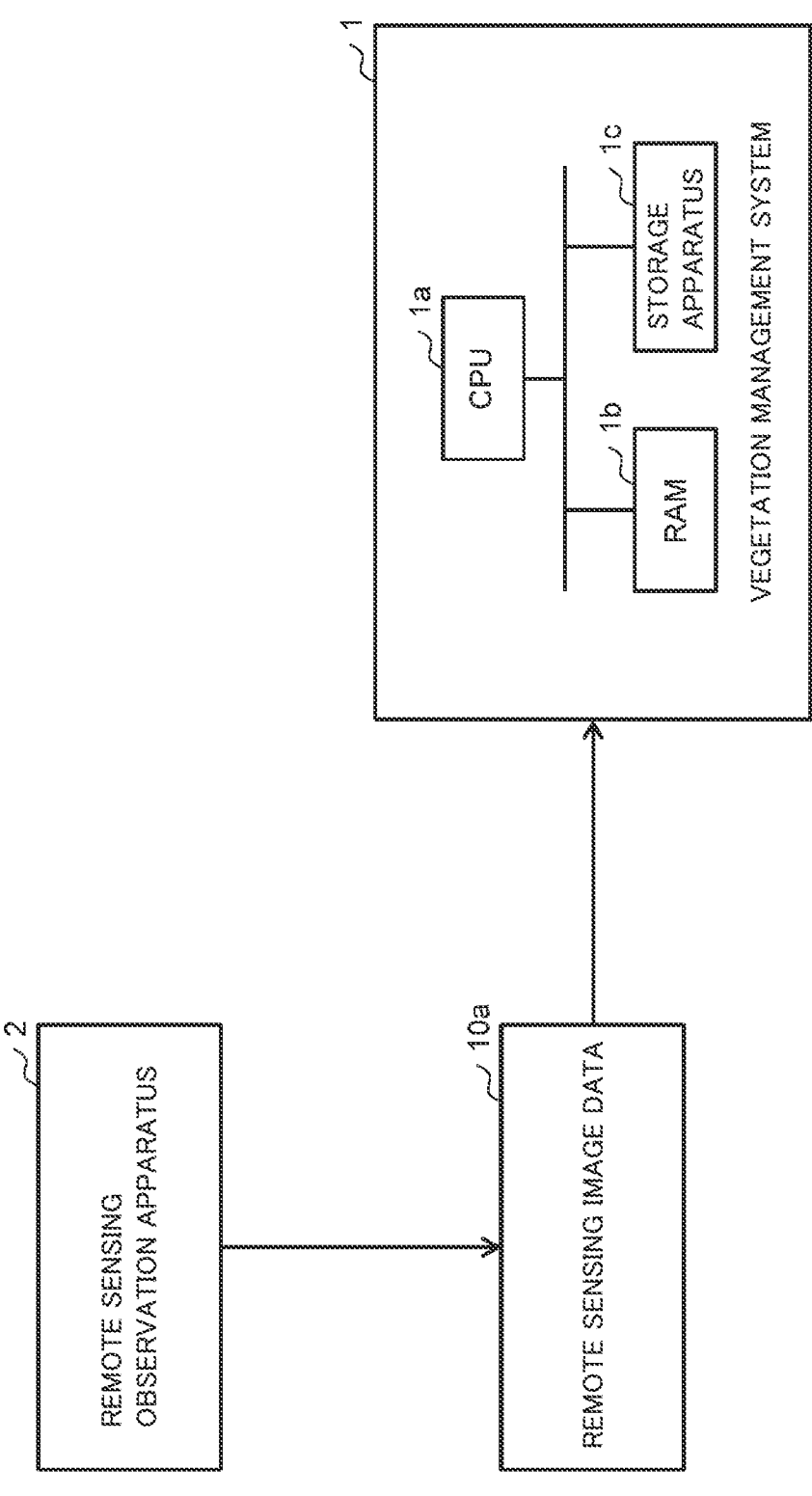
FIG. 2 is a block diagram illustrating is a hardware configuration example of vegetation management system 1.

FIG. 2 is a block diagram illustrating a hardware configuration example of vegetation management system 1. In FIG. 2, a state in which remote sensing image data 10a provided from a remote sensing observation apparatus 2 is input to vegetation management system 1 is illustrated.

In FIG. 2, remote sensing observation apparatus 2 is an observation satellite, an aircraft, or the like including a remote sensing sensor (a LiDAR and the like), and the type thereof is not limited. Remote sensing observation apparatus 2 regularly provides remote sensing image data 10a as an observation result obtained by the remote sensing sensor. Vegetation management system 1 acquires remote sensing image data 10a as one piece of input data 10.

Vegetation management system 1 can be realized by a general computer system (PC) having an arithmetic function and includes a central processing unit (CPU) 1a, a random access memory (RAM) 1b, a storage apparatus 1c, and the like as illustrated in FIG. 2, for example. Vegetation management system 1 may include configurations other than that illustrated in FIG. 2 and can be conceived to include an output apparatus such as a display as an output destination of the maintenance instruction, for example.

In vegetation management system 1, the function units (data acquisition unit 11, database generation unit 12, vegetation classification unit 13, wide-area growth prediction unit 14, vegetation amount simulation unit 15, three-dimensional construction unit 16, risk determination unit 17, visualization unit 18, and maintenance instruction unit 19) illustrated in FIG. 1 each perform arithmetic processing, and hence are implemented as a plurality of combinations of CPU 1a and RAM 1b divided by roles. Each of those function units can perform reading/writing of data by accessing storage apparatus 1c. Database 20 of vegetation management system 1 illustrated in FIG. 1 is implemented by storage apparatus 1c. Specifically, storage apparatus 1c can include not only storage media such as a hard disk drive (HDD) and a solid state drive (SSD) built in the PC but can also include storage media such as a universal serial bus (USB) memory externally connected to the PC, for example. Storage means such as a database connected to the PC in a manner in which communication is possible over a network may also be included in one example of storage apparatus 1c.

Figure 3:
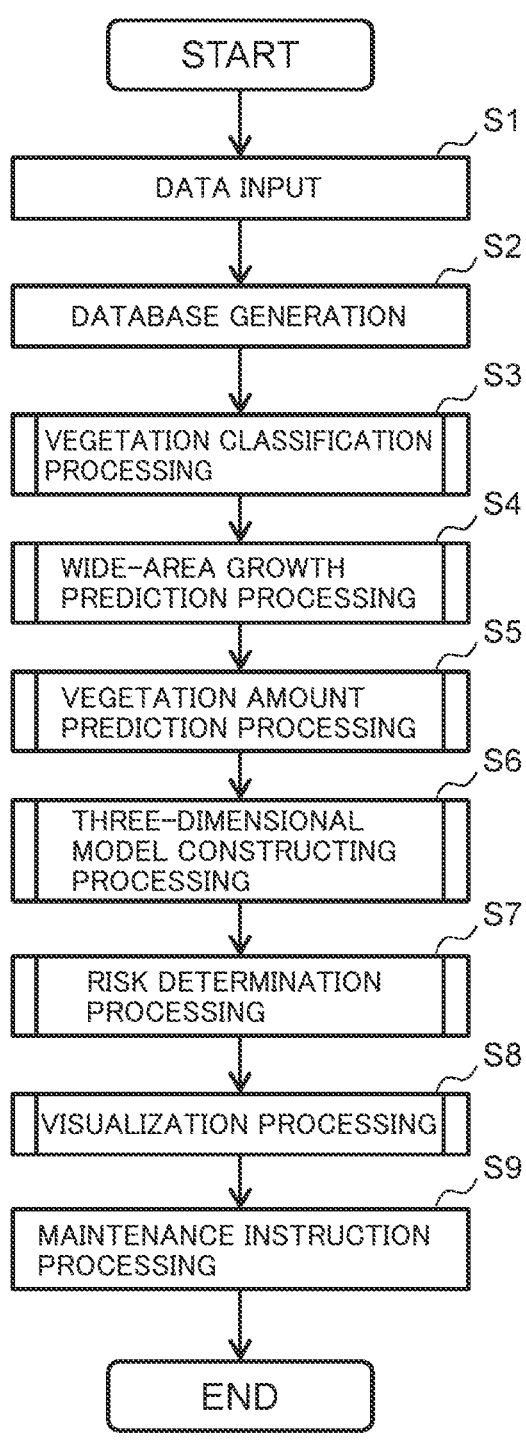
FIG. 3 is a flowchart illustrating a processing procedure of the entire processing in vegetation management system 1.

FIG. 3 is a flowchart illustrating a processing procedure of the entire processing in vegetation management system 1. Prior to the start of the processing illustrated in FIG. 3, a region to be analyzed (target region) is designated in vegetation management system 1 by the user.

First, in Step S1, input data 10 is input to vegetation management system 1 by data acquisition unit 11. When description is made with individual configurations of data acquisition unit 11, remote sensing image data acquisition unit 11a acquires remote sensing image data 10a and spectral library data 10b, geographical information data acquisition unit 11b acquires geographical information data 10c, environment information data acquisition unit 11c acquires environment information data 10d, and management information data acquisition unit 11d acquires management information data 10e. Input data 10 acquired by data acquisition unit 11 in Step S1 is transmitted to database generation unit 12.

In next Step S2, database generation unit 12 stores input data 10 transmitted from data acquisition unit 11 in Step S1 in database 20, performs predetermined data generation processing, and stores the processed data in database 20.

The data generation processing is mainly processing for preparing intermediate data necessary for performing processing by each unit described later. In detail, processing as below is performed. In the data generation processing, first, database generation unit 12 performs masking of the target region designated by the user in remote sensing image data 10a (for example, a satellite image) in time series of the past with use of information on the position and the shape included in geographical information data 10c. Database generation unit 12 generates "mapping data" of the target region by combining "remote sensing data" obtained by extracting the target region that is a masking part from remote sensing image data 10a and "geographical data" obtained by extracting information relating to the target region from geographical information data 10c. Database generation unit 12 also performs masking of the target region in spectral library data 10b and environment information data 10d and generates "spectral library" and "environmental data" obtained by extracting information relating to the target region. Database generation unit 12 may also perform masking of the target region in management information data 10e and extract "management data" obtained by extracting information relating to the target region. Then, database generation unit 12 stores the generated remote sensing data, geographical data, mapping data, spectral library, environmental data, and management data in database 20.

In next Step S3, vegetation classification unit 13 discriminates the type of the vegetation on the basis of the remote sensing data and the geographical data (or the mapping data obtained by combining the remote sensing data and the geographical data) and the spectral library generated in Step S2, generates a "vegetation classification map" in which the discriminated type of the vegetation is reflected in the mapping data, and stores the "vegetation classification map" in database 20 (vegetation classification processing). Details of the vegetation classification processing are described later with reference to FIG. 5 and the like.

In next Step S4, wide-area growth prediction unit 14 predicts a wide-area range fluctuation (wide-area vegetation growth) in time series for the vegetation classified in Step S3 with use of the vegetation classification map generated in Step S3 and the remote sensing data in time series of the past stored in database 20 and stores the prediction result in database 20 (wide-area growth prediction processing). Details of the wide-area growth prediction processing are described later with reference to FIG. 7 and the like.

In next Step S5, vegetation amount simulation unit 15 simulates, for each vegetation, a fluctuation of the vegetation amount of the corresponding vegetation with use of the vegetation classification map, the environmental data, and a biological growth model (growth model) of the classified vegetation stored in database 20 and stores the simulation result in database 20 (vegetation amount prediction processing). The growth model of the vegetation is stored in database 20 in advance. Details of the vegetation amount prediction processing are described later with reference to FIG. 9 and the like.

In next Step S6, three-dimensional construction unit 16 generates a three-dimensional model including the power facility (a power distribution line, a power transmission line, and the like) and the vegetation and stores the generated three-dimensional model in database 20 (three-dimensional model constructing processing). Details of the three-dimensional model constructing processing are described later with reference to FIG. 11 and the like.

In next Step S7, risk determination unit 17 determines (calculates) a contact risk between the vegetation and the power facility in consideration of a time-series fluctuation of the vegetation and the positional relationship between the vegetation and the power facility in the wide-area range on the basis of the prediction result of the wide-area vegetation growth obtained by wide-area growth prediction unit 14, the prediction result of the vegetation amount prediction processing obtained by vegetation amount simulation unit 15, and the like stored in database 20, and stores the determination result (risk determination result) in database 20 (risk determination processing). Details of the risk determination processing are described later with reference to FIG. 13 and the like.

In next Step S8, visualization unit 18 performs two-dimensional or three-dimensional visualization in accordance with a time interval of a particular time (or time designated by the user) on the basis of the prediction result of the wide-area vegetation growth obtained by wide-area growth prediction unit 14, the prediction result of the vegetation amount prediction processing obtained by vegetation amount simulation unit 15, the determination result of the risk determination processing obtained by risk determination unit 17, and the like stored in database 20 (visualization processing). The visualization processing is divided into two-dimensional visualization processing and three-dimensional visualization processing, and details of those pieces of processing are described later with reference to FIG. 15 to FIG. 18.

In last Step S9, maintenance instruction unit 19 selects necessary maintenance work on the basis of the determination result of the risk determination processing obtained by risk determination unit 17 and management information data 10e (or management data) stored in database 20 and presents the maintenance instruction to the user by outputting the selection result (maintenance instruction processing). In the selection of the maintenance work by maintenance instruction unit 19, the specification of a staff dispatching plan, a vehicle allocation plan, and a transportation route for equipment and the like are performed in addition to the identification of the maintenance place, for example. Details of the maintenance instruction processing are described later with reference to FIG. 19 and the like.

By performing the processing of Steps S1 to S9 described above, in vegetation management system 1, for the target region designated by the user, the contact risk between the power facility and the vegetation can be accurately analyzed at a low cost with use of the remote sensing data even when the target region is a wide area, and an instruction for a precise maintenance work can be given to the user on the basis of the analysis result. In vegetation management system 1, various data (the input data, the intermediate data, and the output data) input or generated in a series of analyses described above are stored in database 20, and hence those pieces of data can be used in analyses at that point and thereafter or in different analyses.

Figure 4:
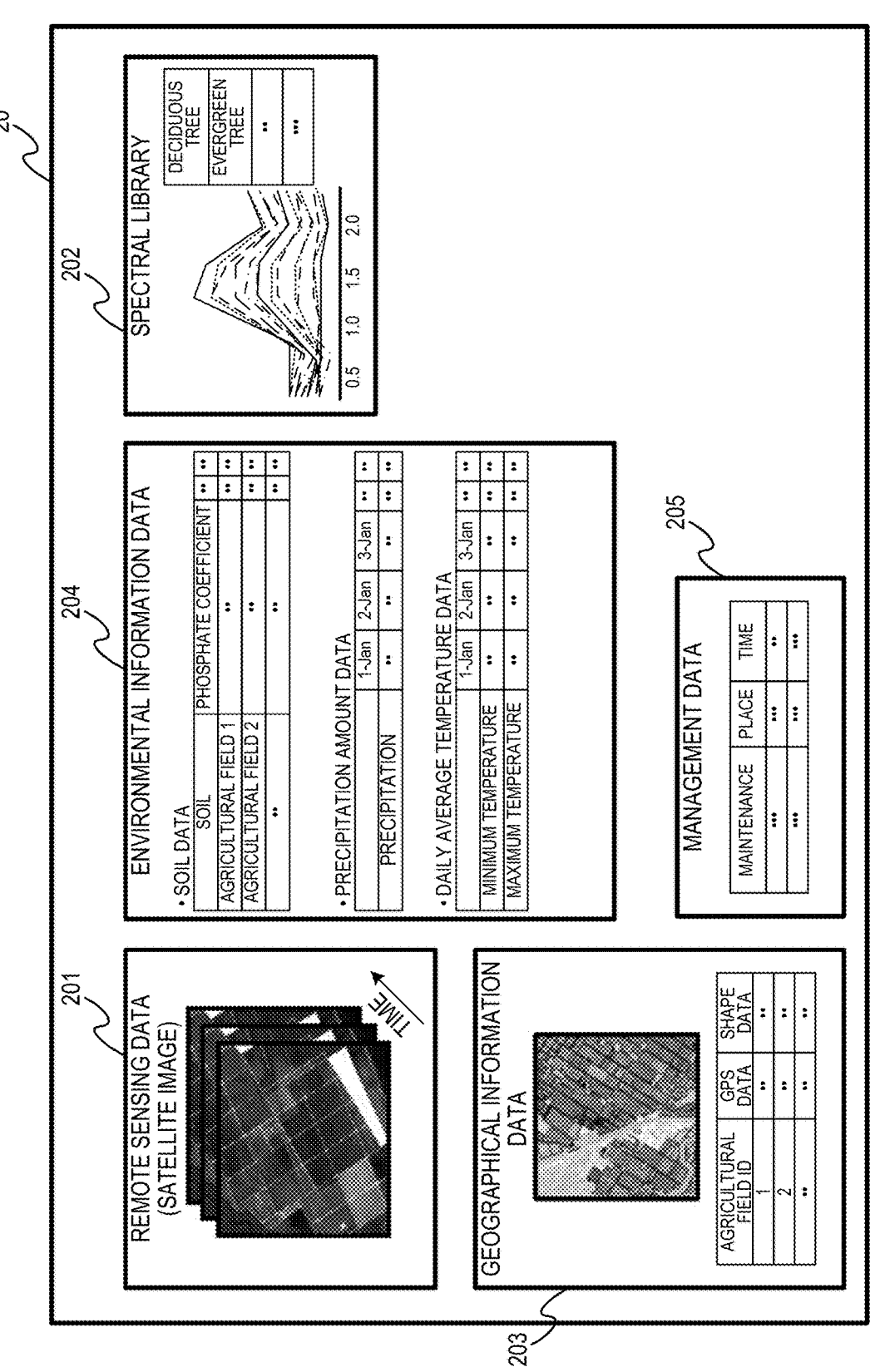
FIG. 4 is a view describing images of data stored in a database 20.

FIG. 4 is a view describing images of the data stored in database 20. In FIG. 4, as one example of data used as the intermediate data, images of remote sensing data 201, a spectral library 202, geographical data 203, environmental data 204, and management data 205 are visually shown.

As described above in Step S2, remote sensing data 201 is one example of remote sensing image data 10a in time series obtained by extracting the target region by database generation unit 12. Similarly, spectral library 202 is one example of spectral library data 10b obtained by extracting information relating to the target region, geographical data 203 is one example of geographical information data 10c obtained by extracting information relating to the target region, environmental data 204 is one example of environment information data 10d obtained by extracting information relating to the target region, and management data 205 is one example of management information data 10e obtained by extracting information relating to the target region. However, in FIG. 4, detailed illustration of the content of each piece of information is omitted for simplicity.

Figure 5:
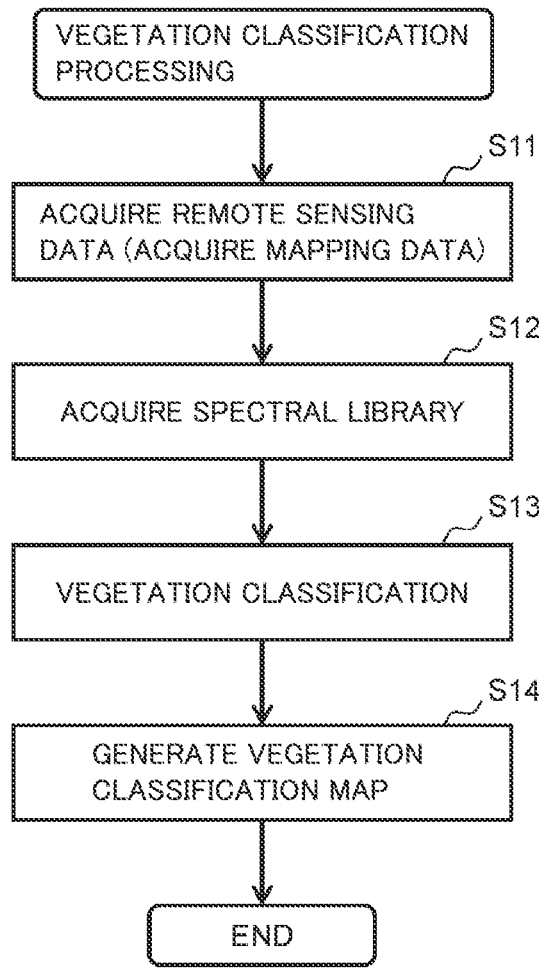
FIG. 5 is a flowchart illustrating a processing procedure example of vegetation classification processing.

FIG. 5 is a flowchart illustrating a processing procedure example of the vegetation classification processing. As described above, the vegetation classification processing is equivalent to the processing of Step S3 in FIG. 3 and is executed by vegetation classification unit 13.

According to FIG. 5, first, vegetation classification unit 13 acquires mapping data of the target region generated by combining the remote sensing data and the geographical data by database generation unit 12 in Step S2 in FIG. 3 (Step S11). Next, vegetation classification unit 13 acquires the spectral library generated in Step S2 in FIG. 3 (Step S12).

In Step S11 and Step S12, vegetation classification unit 13 may directly acquire the target data from database generation unit 12 or may acquire the target data stored in database 20. This is because, in vegetation management system 1 according to this embodiment, all pieces of data including the intermediate data are basically stored in database 20. Similarly, in processing by other function units described later, desired data may be acquired from function units serving as generators or may be acquired from database 20.

Next, vegetation classification unit 13 discriminates the type of the vegetation in the mapping data (in other words, remote sensing image data 10a in the mapped range) with use of the mapping data and spectral library acquired in Steps S11 to S12 (Step S13). As a specific method of "vegetation classification" that discriminates the type of the vegetation, an approach of machine learning can be used, for example. In this case, vegetation classification unit 13 can estimate the type of the vegetation from the spectral feature amount of the vegetation by learning the spectral library. The method of vegetation classification is not limited to the example described above, and other well-known approaches may be used.

Next, vegetation classification unit 13 generates a vegetation classification map by recording geographical data for each type of vegetation classified in Step S13 and provides the vegetation classification map to database 20 (Step S14).

The processing of Steps S11 to S14 may be repeatedly executed for the mapping data of the past in time series. As a result, vegetation classification unit 13 can generate the vegetation classification map of the past in time series.

Figure 6:
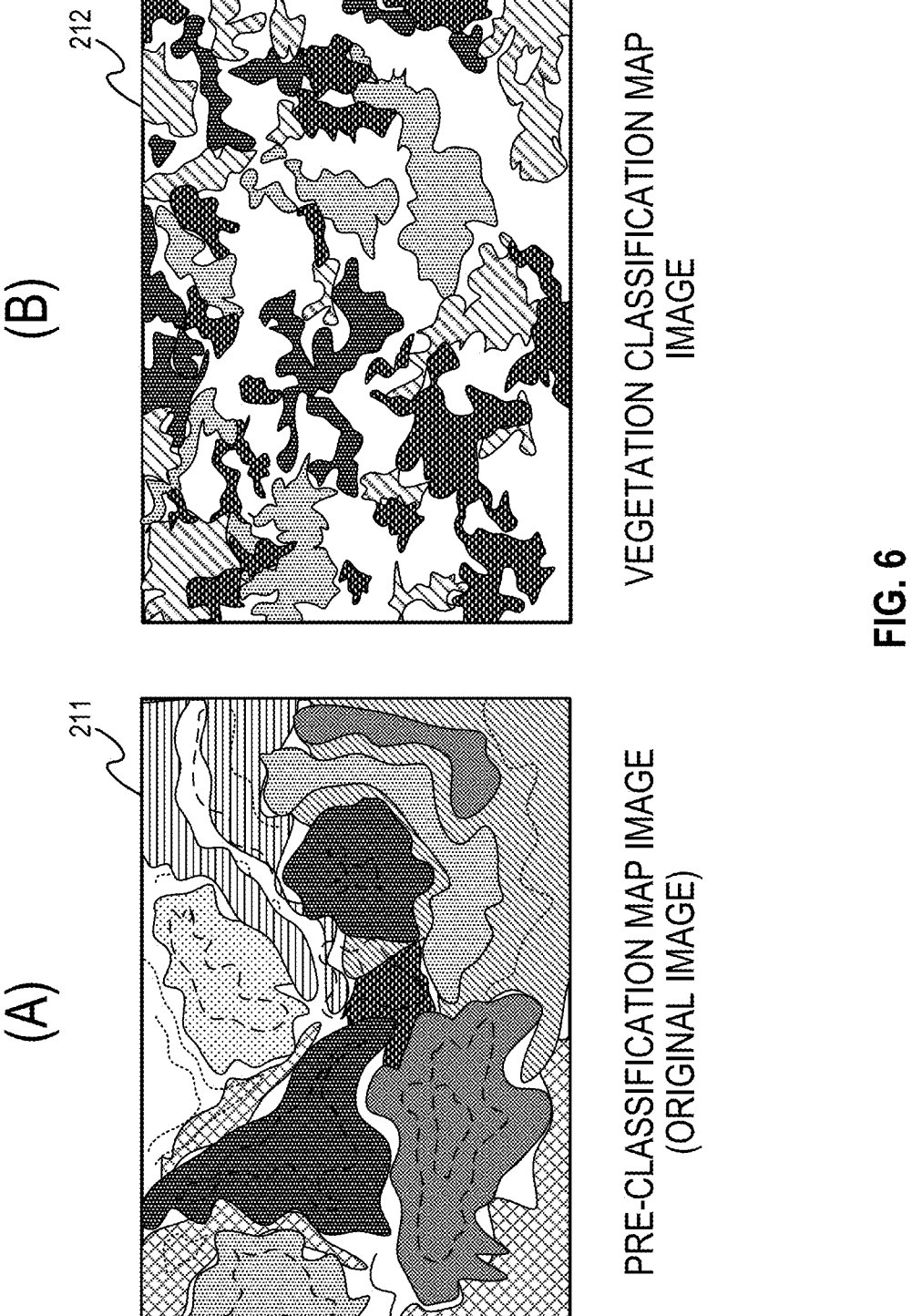
FIG. 6 is a view describing one example of vegetation classification maps.

FIG. 6 is a view describing one example the vegetation classification maps. In FIG. 6(A), a pre-classification map image 211 is shown as one example of mapping data before the vegetation classification in Step S13 in FIG. 5 is performed. In FIG. 6(B), a vegetation classification map image 212 is shown as one example of mapping data (a vegetation classification map) after the vegetation classification generated in Step S14 in FIG. 5. As shown in FIG. 6(A), pre-classification map image 211 is a normal satellite image. Meanwhile, vegetation classification map image 212 shown in FIG. 6(B) is generated by a mapping image obtained by coloring pre-classification map image 211 for each type of vegetation through the vegetation classification. In vegetation classification map image 212, color-coding for ranges and shapes may also be performed for geographical information included in the mapping data before the vegetation classification.

Figure 7:
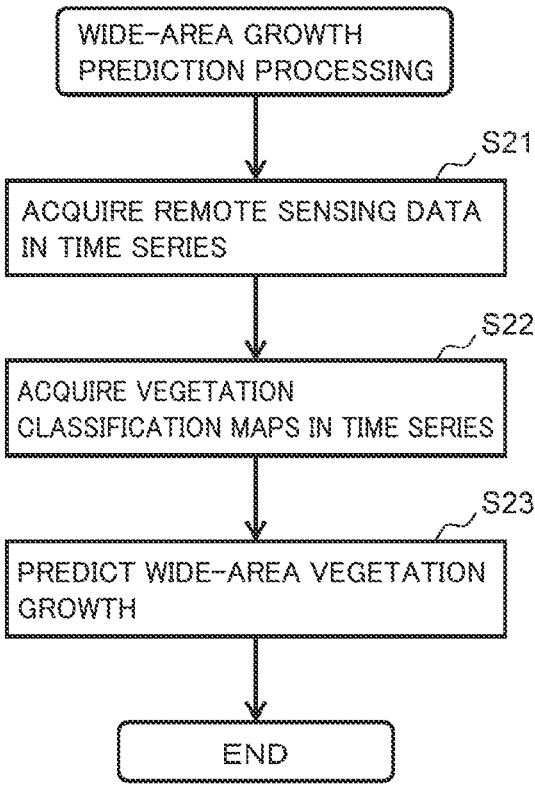
FIG. 7 is a flowchart illustrating a processing procedure example of wide-area growth prediction processing.

FIG. 7 is a flowchart illustrating a processing procedure example of the wide-area growth prediction processing. As described above, the wide-area growth prediction processing is equivalent to the processing of Step S4 in FIG. 3 and is executed by wide-area growth prediction unit 14.

According to FIG. 7, first, wide-area growth prediction unit 14 acquires remote sensing data in time series of the past (satellite images in this example) stored in database 20 (Step S21). The remote sensing data acquired in Step S21 is satellite images obtained by extracting the target region from remote sensing image data 10*a* (satellite images) in time series of the past.

Next, wide-area growth prediction unit 14 acquires the vegetation classification maps of the past in time series generated in the vegetation classification processing in FIG. 5 (Step S22).

Next, wide-area growth prediction unit 14 predicts a time-series fluctuation of the vegetation growth in a wide-area range (wide-area vegetation growth) for the vegetation classified in the vegetation classification processing on the basis of the data acquired in Steps S21, S22 (Step S23). Examples of a prediction method of the wide-area vegetation growth include a method of predicting a time-series fluctuation with use of a recurrent neural network (RNN), but methods other than the method may be used, for example. Then, wide-area growth prediction unit 14 stores the prediction result of the wide-area vegetation growth in database 20.

Figure 8:
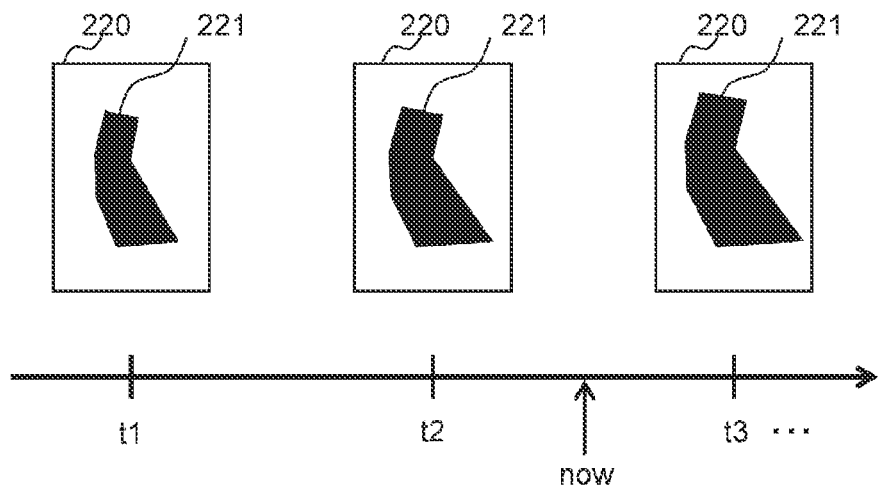
FIG. 8 is a view describing images of processing of predicting wide-area vegetation growth.

FIG. 8 is a view describing images of processing of predicting the wide-area vegetation growth. In FIG. 8, two-dimensional maps 220 at each time out of time t1, t2 of the past and time t3 of the future are shown, and vegetation range 221 is shown in each of two-dimensional maps 220 as an image of a wide-area vegetation range. Vegetation ranges 221 at time t1, t2 of the past are derived from the remote sensing data (for example, a satellite image) and the vegetation classification map of each time, and vegetation range 221 at time t3 of the future is predicted from a time-series fluctuation of vegetation range 221 in time t1, t2 of the past. In the case of FIG. 8, it is predicted that vegetation range 221 expands from time t1, t2 of the past to time t3 of the future.

Figure 9:
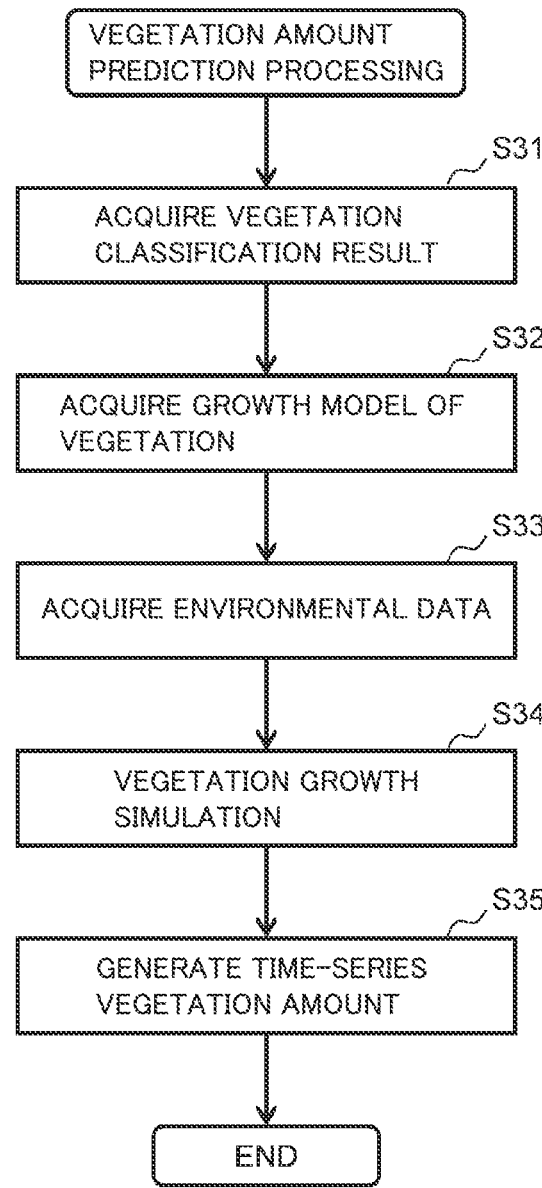
FIG. 9 is a flowchart illustrating a processing procedure example of vegetation amount prediction processing.

FIG. 9 is a flowchart illustrating a processing procedure example of the vegetation amount prediction processing. As described above, the vegetation amount prediction processing is equivalent to the processing of Step S5 in FIG. 3 and is executed by vegetation amount simulation unit 15. The vegetation amount simulated in the vegetation amount prediction processing specifically include the size of a tree crown, the weight of a leaf, the length of a stem, the number of branches, and biomass amount, for example.

According to FIG. 9, first, vegetation amount simulation unit 15 acquires the result of the vegetation classification (vegetation classification map) by the vegetation classification processing in FIG. 5 (Step S31).

Next, vegetation amount simulation unit 15 acquires, for the vegetation shown on the vegetation classification map acquired in Step S31, a growth model of the corresponding vegetation from database 20 (Step S32). The growth model of the vegetation is stored in database 20 in advance for each vegetation.

A supplementary description is given for the growth model of the vegetation. In fields of forestry and agriculture, research on growth models of plants has been made. In a lot of research, (1) to (4) described below are pointed out as factors that affect tree growth.

(1) An environmental factor. Specifically, examples include light (for example, heliotropism of growing in a direction with strong light), the situation of the wind, the latitude/longitude, the temperature, the geological condition, the water, the region, and the location. For example, even when the tree species are the same, the speed of growth differs between a cold region and a warm region.

(2) A genetic factor. As the genetic factor, there is mainly a difference in growth due to tree species. For example, there are various branching patterns (dichotomous branching, sympodial branching, and monopodial branching) according to tree species, and there are trees that form two types of branches called a long branch and a short branch even when the tree species are the same. It is conceived that the long branch has a stretching orientation of growing toward a new space and the short branch has a leaf-area expansion orientation of increasing the light received at the current place.

(3) Effects of a neighboring individual. The environmental factor and the genetic factor described above affect the growth degree of each individual. However, when a plurality of trees are gathering together, interaction between the trees also affect the growth. Therefore, the situation of neighboring individuals is also a factor to be considered in the construction of a growth model.

(4) A timewise factor. Specifically, examples include seasons and tree age. There is a wide variety of factors that affect tree growth. For example, a tree has a period in which growth is active and a period in which growth is not active in a year, and the growth speed and the tree height differ according to the tree age.

Research of modeling the growth of a tree by computer simulation is performed in consideration of various factors as described above.

For example, regarding a branching model, there are some branching models that generate small branches having a stretching orientation in a Y-like shape (an inverted "to" shape in Japanese katakana) with respect to the axis of a parent branch and generate small branches having a leaf-area expansion orientation in a Y-shape on a plane of the maximum inclination of the parent branch. Regarding a light environment model, there is a model that approximates foliage formed on a tip of a branch by a ball called a leaf ball. By the light environment model, the light receiving obtained by the leaf ball and the direction (light vector) in which the light reaches the most on average can be calculated, and heliotropism can be realized by rotating the tip of the branch in the orientation of the light receiving vector.

Regarding the relationship between the tree age and the tree height, an exponential model is widely used. In the exponential model, a tree height H can be expressed by Expression 1 below, for example, with use of a tree age t and a coefficient k that depends on the type and the size of the tree.

[Math 1]

$$H=H_m(1-k^t) \qquad \text{(Expression 1)}$$

where $H_m$ represents a maximum tree height in Expression 1.

Tree height H may be expressed by Expression 2 below obtained by generalizing Expression 1.

[Math 2]

$$H=a-b\times c^t \qquad \text{(Expression 2)}$$

where a, b, and c represent constants in Expression 2.

Research on the growth prediction of a forest by a Mitscherlich equation expressed in Expression 3 below is also performed.

[Math 3]

$$dY/dN=\varepsilon(Y_{max}-Y) \qquad \text{(Expression 3)}$$

where Y represents a developing amount (degree of growth), N represents a given nutrient amount, ε represents an effect factor (constant) of the Mitscherlich, and Ymax represents an assumed maximum developing amount (constant) in Expression 3.

Several growth models of vegetation have been described in detail above, but growth models usable in the vegetation amount prediction processing according to this embodiment are not limited to the above.

The description returns to the description of FIG. 9. Vegetation amount simulation unit 15 acquires, from database 20, environmental data corresponding to the growth model acquired in Step S32 (Step S33) and performs a simulation of vegetation growth using the growth model (Step S34).

Figure 10:
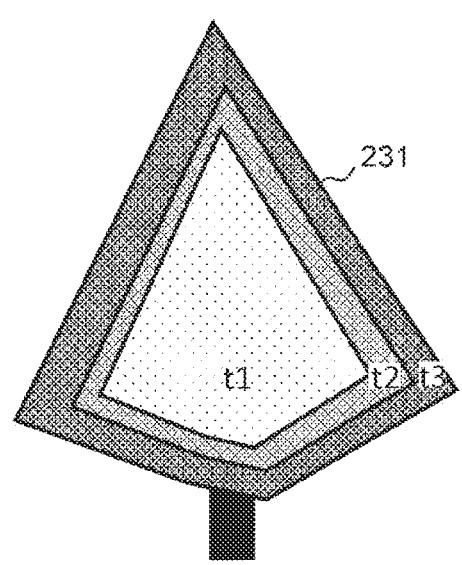
FIG. 10 is a view describing an image of a vegetation growth simulation.

FIG. 10 is a view describing an image of the vegetation growth simulation. In FIG. 10, a tree crown 231 expressing a growth image of a tree crown at each time out of time t1, t2 of the past and time t3 of the future is shown. Time t1 to t3 shown in FIG. 10 correspond to time t1 to t3 shown in FIG. 8. Vegetation amount simulation unit 15 performs a vegetation growth simulation of the tree crown. As a result, as shown in FIG. 10, a fluctuation in the size of tree crown 231 at each of time t1 to t3 can be predicted.

In FIG. 10, a prediction of a fluctuation in the size of a tree crown is given as one example of the vegetation growth simulation, but it may be conceived that simulation is similarly performed for other vegetation amounts in the vegetation growth simulation in Step S34 in FIG. 9.

The description returns to the description of FIG. 9. After the vegetation growth simulation is performed in Step S34, vegetation amount simulation unit 15 generates a fluctuation curve of the vegetation amount in a time series manner (time-series vegetation amount) as a simulation result and stores the fluctuation curve in database 20 (Step S35).

Figure 11:
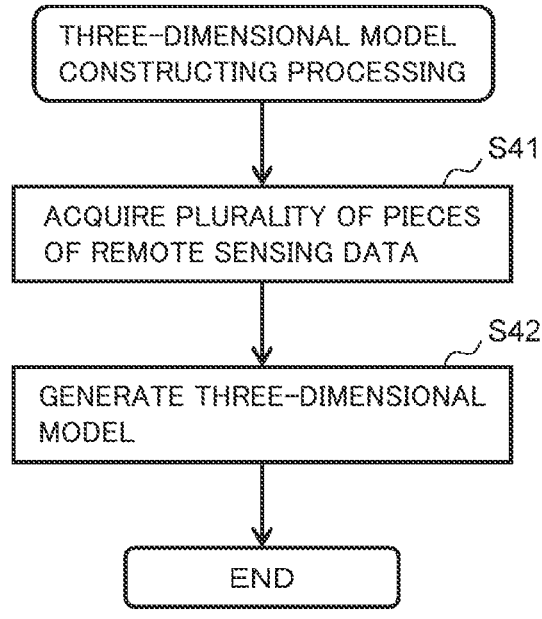
FIG. 11 is a flowchart illustrating a processing procedure example of three-dimensional model constructing processing.

FIG. 11 is a flowchart illustrating a processing procedure example of the three-dimensional model constructing processing. As described above, the three-dimensional model constructing processing is equivalent to the processing of Step S6 in FIG. 3 and is executed by three-dimensional construction unit 16.

According to FIG. 11, first, three-dimensional construction unit 16 acquires a plurality of pieces of remote sensing data photographed at a designated time (Step S41). The designated time only needs to be time t1 or time t2 described above, for example. The plurality of pieces of remote sensing data are remote sensing data photographed from a plurality of viewpoints necessary for generating a three-dimensional model, and photographing entities may be remote sensing sensors of the same type or remote sensing sensors of different types.

Next, three-dimensional construction unit 16 performs three-dimensional reconstruction with use of the remote sensing data acquired in Step S41 and generates a three-dimensional model of the target region at the designated time (Step S42). Then, three-dimensional construction unit 16 stores the generated three-dimensional model in database 20.

Examples of an approach of generating a three-dimensional model of a designated object (target region) at a designated time in Step S42 include a method of performing three-dimensional reconstruction from photographed data (LiDAR data) of the power facility and the vegetation photographed by a LiDAR (one example of the remote sensing sensor) mounted on a drone (one example of remote sensing observation apparatus 2). As the three-dimensional reconstruction, various methods are widely known. For example, other than the above, the three-dimensional model can also be generated by structure from motion (SFM) using a plurality of images.

Figure 12:
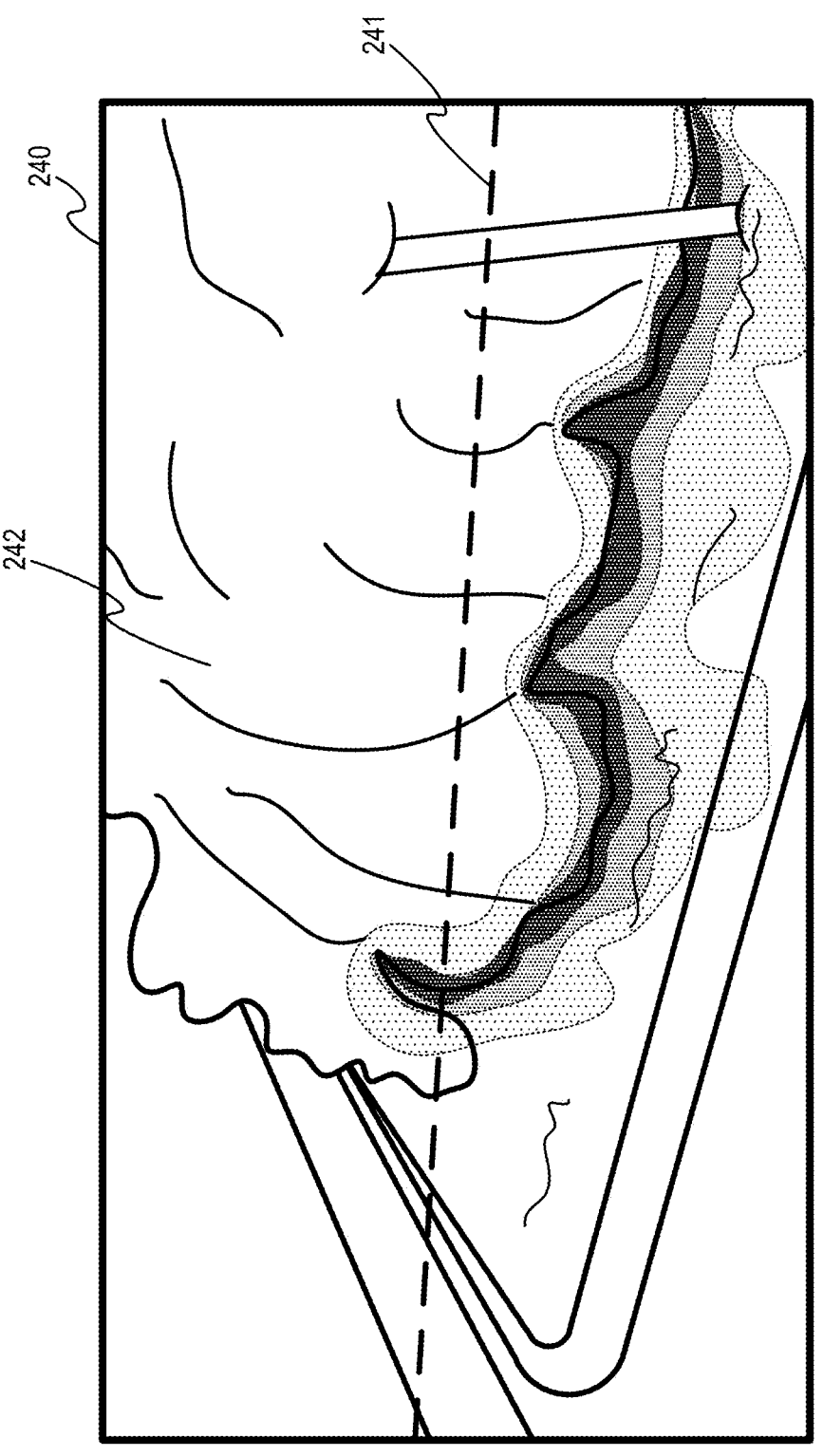
FIG. 12 is a view showing one example of a three-dimensional model.

FIG. 12 is a view showing one example of a three-dimensional model. According to a three-dimensional model 240 exemplified in FIG. 12, it is shown that a power facility (a power transmission line 241 in this example) exists near vegetation 242 in the target region.

Figure 13:
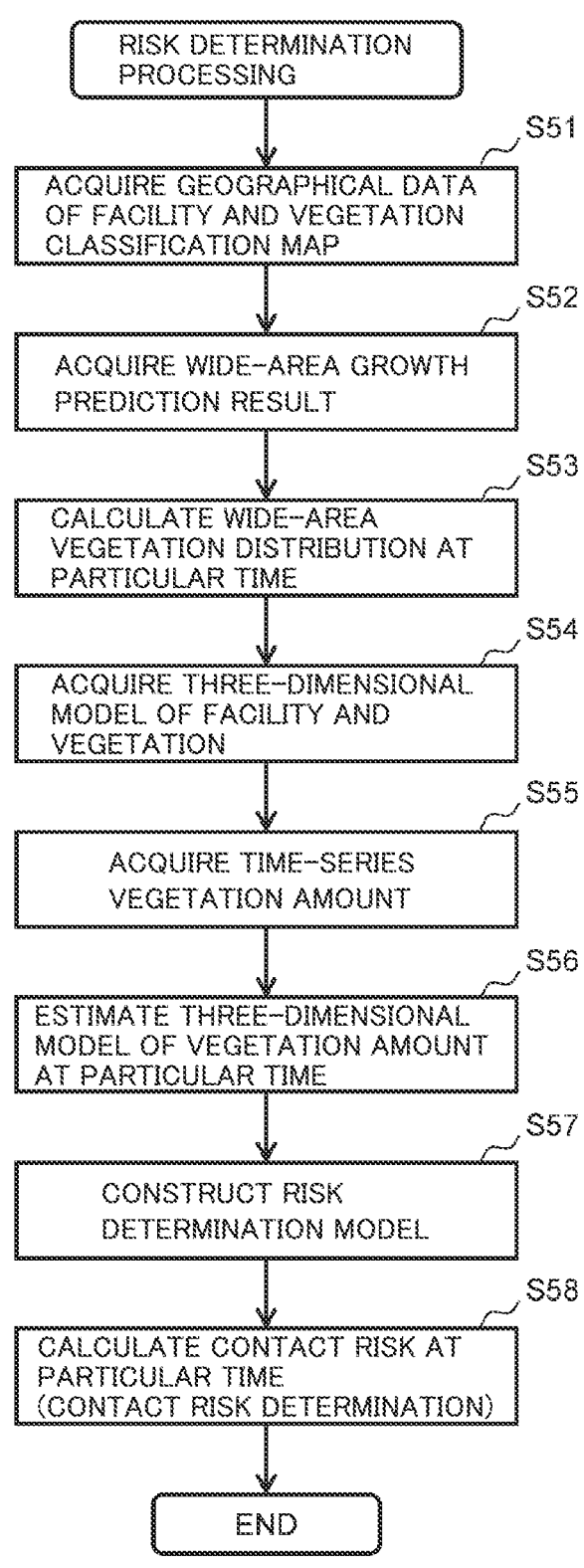
FIG. 13 is a flowchart illustrating a processing procedure example of risk determination processing.

FIG. 13 is a flowchart illustrating a processing procedure example of the risk determination processing. As described above, the risk determination processing is equivalent to the processing of Step S7 in FIG. 3 and is executed by risk determination unit 17. In FIG. 13, the execution order of a series of processing of Steps S51 to S53 and a series of processing of Steps S54 to S56 may be changed or may be executed in parallel to each other.

First, the processing of Steps S51 to S53 in FIG. 13 is described.

In Step S51, risk determination unit 17 acquires geographical data relating to the power facility and the vegetation classification map generated in the vegetation classification processing in FIG. 5 and inputs the geographical data and the vegetation classification map in risk determination unit 17. The geographical data relating to the power facility only needs to be data including geographical information of a power distribution line or a power transmission line in the target region and may be substituted for other data having information on the position and the shape of the power facility, for example. Then, in Step S52, risk determination unit 17 acquires the prediction result of the wide-area vegetation growth obtained by the wide-area growth prediction processing in FIG. 7 and inputs the prediction result in risk determination unit 17.

Then, in Step S53, risk determination unit 17 maps the prediction result of the wide-area vegetation growth onto the remote sensing data (two-dimensional mapping data) having the information on the power facility, for example, on the basis of the data input in Steps S51, S52, to thereby calculate a range in which particular vegetation is distributed at a designated particular time (for example, time t3). Then, risk determination unit 17 stores the calculation result (a wide-area vegetation distribution at a particular time) in database 20.

Next, the processing of Steps S54 to S56 in FIG. 13 is described.

In Step S54, risk determination unit 17 acquires the three-dimensional model of the power facility and the vegetation generated in the three-dimensional model constructing processing in FIG. 11 and inputs the three-dimensional model in risk determination unit 17. Then, in Step S55, risk determination unit 17 acquires the simulation result of the vegetation amount (time-series vegetation amount) generated in the vegetation amount prediction processing in FIG. 9 and inputs the simulation result in risk determination unit 17.

Then, in Step S56, risk determination unit 17 estimates how the vegetation amount changes in the three-dimensional model at a designated particular time (for example, time t3) in the target region on the basis of the data input in Steps S54, S55 and stores the estimation result (a vegetation amount estimation three-dimensional model at a particular time) in database 20.

Figure 14:
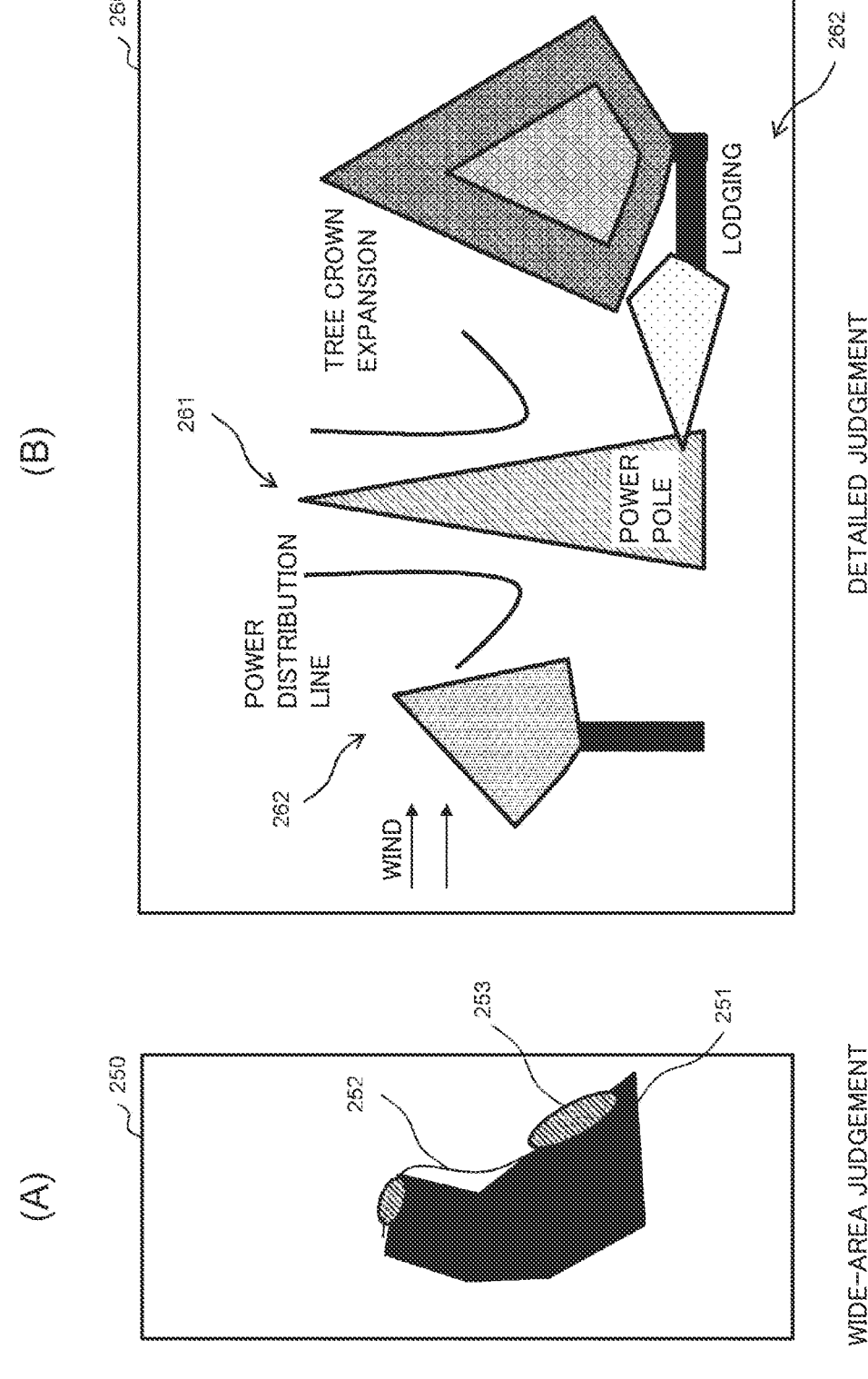
FIG. 14 is a view showing one example of a risk determination model.

After the processing of Steps S51 to S53 and Steps S54 to S56 above has ended, in Step S57, risk determination unit 17 constructs a model (risk determination model) for determining a contact risk with the power facility (for example, a power transmission line or a power distribution line). Specifically, for example, risk determination unit 17 constructs a risk determination model for "wide-area judgement" that determines the contact risk between the power facility and the vegetation in a wide-area range with use of the wide-area vegetation distribution at a particular time calculated in Step S53 and constructs a risk determination model for "detailed judgement" that determines a detailed contact risk between the power facility and the vegetation with use of the vegetation amount three-dimensional estimation model at a particular time estimated in Step S56. As the model construction method of the risk determination model, various approaches may be employed. In FIG. 14 described later, an image example of the risk determination model is shown.

Then, in Step S58, risk determination unit 17 calculates the contact risk between the vegetation and the power facility at a particular time with use of the risk determination model constructed in Step S57 and stores the determination result (risk determination result) in database 20. In Step S58, first, risk determination unit 17 performs contact risk determination in a wide-area range with use of the risk determination model for wide-area judgement and performs a more detailed contact risk determination with use of the risk determination model for detailed judgement for places (risk spots) in which it is estimated that the possibility of the vegetation and the power facility coming into contact with each other is high by the determination (see FIG. 14). As above, by taking both evaluation results of the wide-area judgement and the detailed judgement, risk determination unit 17 can determine (calculate) the contact risk between the vegetation and the power facility with high precision.

FIG. 14 is a view showing one example of the risk determination model. A risk determination model 250 for wide-area judgement is shown in FIG. 14(A), and a risk determination model 260 for detailed judgement is shown in FIG. 14(B).

Risk determination model 250 for wide-area judgement in FIG. 14(A) is constructed on the basis of the wide-area vegetation distribution at a particular time calculated in Step S53 and specifically has a vegetation range 251 based on the prediction result of the wide-area vegetation growth (see FIG. 8), and a power transmission line 252 based on geographical information of the power facility included in the remote sensing data (mapping data). Risk determination unit 17 estimates a place (risk spot 253) in which the possibility of the vegetation and the power facility coming into contact with each other is high with use of risk determination model 250 described above at the time of the contact risk determination of the wide-area judgement.

Risk determination model 260 for detailed judgement in FIG. 14(B) is constructed on the basis of the vegetation amount estimation three-dimensional model at a particular time calculated in Step S56 and specifically has a power facility 261 and vegetation 262 based on a time-series vegetation amount obtained by the vegetation growth simulation included in the estimated three-dimensional model. In FIG. 14(B), as vegetation 262 based on the time-series vegetation amount, a simulation result of a tree crown (see FIG. 10) is reflected. However, other elements (for example, the height of the tree, the wind speed, and the lodging) can be reflected in risk determination model 260. Risk determination unit 17 estimates the situation in which the vegetation and the power facility may come into contact with each other in risk spot 253 in detail with use of risk determination model 260 corresponding to the place of risk spot 253 in which it is estimated that the contact risk is high by the wide-area judgement when the contact risk determination of the detailed judgement is performed. For example, in the case of FIG. 14(B), it can be estimated that there is a possibility of contact with a power pole due to the lodging of the vegetation or a possibility of the vegetation coming into contact with power distribution lines due to wind effect, for example. The determination approach of the contact risk determination is not limited to the example described above and other widely-known approaches may be used.

Figure 15:
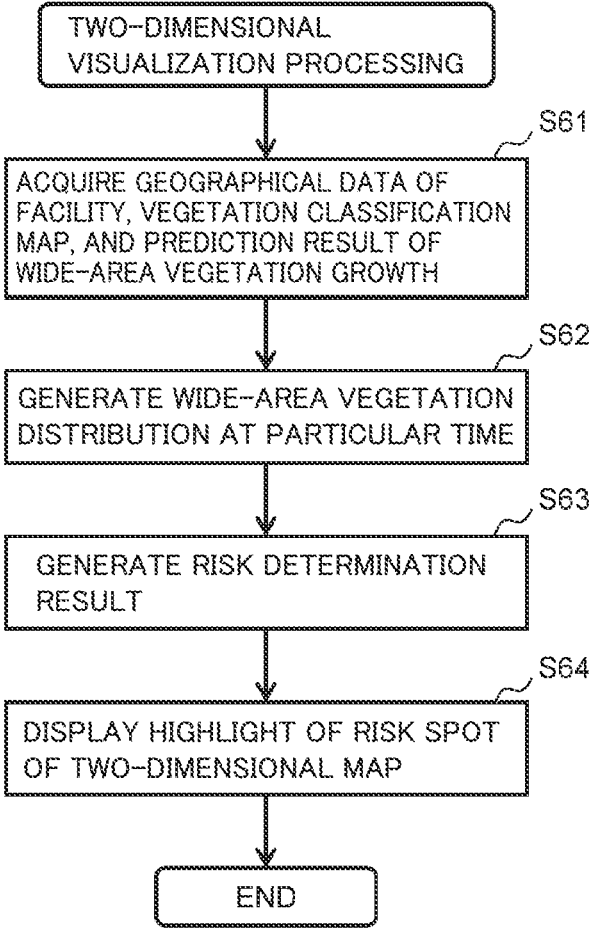
FIG. 15 is a flowchart illustrating a processing procedure example of two-dimensional visualization processing.

FIG. 15 is a flowchart illustrating a processing procedure example of the two-dimensional visualization processing. As described above, the two-dimensional visualization processing is one of the visualization processing of Step S8 in FIG. 3 and is mainly executed by visualization unit 18. However, as described below by the description of each piece of processing, visualization unit 18 does not necessarily need to execute all of the processing, and processing by other function units may be used, as appropriate. The same applies to the three-dimensional visualization processing described in FIG. 17.

According to FIG. 15, first, visualization unit 18 acquires the mapping data including the geographical information of the power facility, the vegetation classification map, and the prediction result of the wide-area vegetation growth from database 20 and inputs the mapping data, the vegetation classification map, and the prediction result in visualization unit 18 (Step S61).

Next, visualization unit 18 generates a wide-area vegetation distribution at a designated time (or in a designated time interval) with use of the prediction result of the wide-area vegetation growth acquired in Step S61 (Step S62).

Next, visualization unit 18 performs contact risk determination that evaluates the contact risk between the vegetation and the power facility in the target region at a designated time (or in a designated time interval) on the basis of the wide-area vegetation distribution generated in Step S62 and generates the risk determination result (Step S63). In the processing of Steps S61 to S63, risk determination unit 17 may be caused to perform calculation of the wide-area vegetation distribution at a particular time and the contact risk determination of the wide-area judgement after being given a designated time, and visualization unit 18 may acquire the determination result.

Lastly, visualization unit 18 displays the risk determination result obtained in Step S63 on a two-dimensional map expressing the target region at a designated time (Step S64). More specifically, for example, a highlight of a contact situation and a contact spot (risk spot) in which the vegetation and the power facility may come into contact with each other at a designated time is displayed on the two-dimensional map. When a time interval is designated by the user as a designated time, a state in which the contact situation and the risk spot fluctuate with the elapse of time in the designated time interval is displayed by a moving image.

Figure 16:
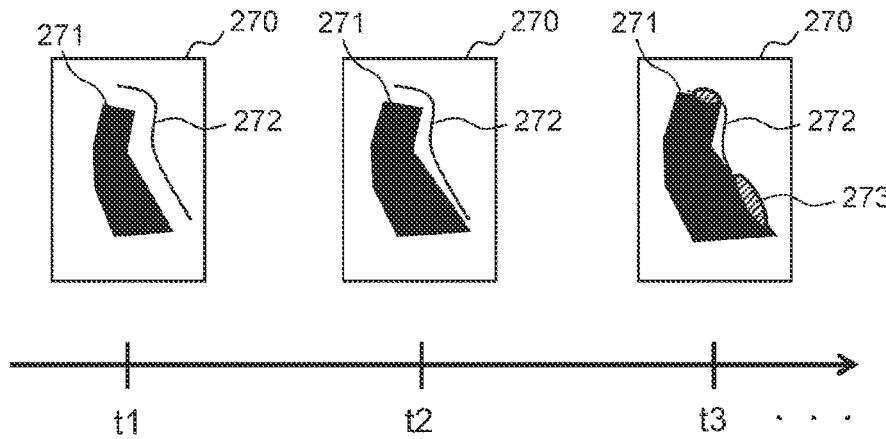
FIG. 16 is a view describing images of two-dimensional visualization.

FIG. 16 is a view describing images of two-dimensional visualization. In FIG. 16, a two-dimensional map 270 of each time displayed by the two-dimensional visualization processing when the particular time (designated time) designated by the user is time t1, t2, t3 is exemplified. In each two-dimensional map 270, a vegetation range 271 and a power transmission line 272 (one example of a power facility) are expressed at each designated time. Out of the above, at time t3, the contact situation and the contact place are indicated in an easily understood manner by displaying a risk spot 273 as an example of a case where it is determined by the contact risk determination that there is a possibility of vegetation range 271 and power transmission line 272 coming into contact with each other. When a time interval from t1 to t3 is designated by the user, a moving image indicating a fluctuation in the contact situation and the risk spot in the designated time interval (temporal resolution) only needs to be displayed.

By performing the two-dimensional visualization processing as above, visualization unit 18 can display the determination result of the contact risk determination of the wide-area judgement at a designated time to the user in an easily understood manner.

Figure 17:
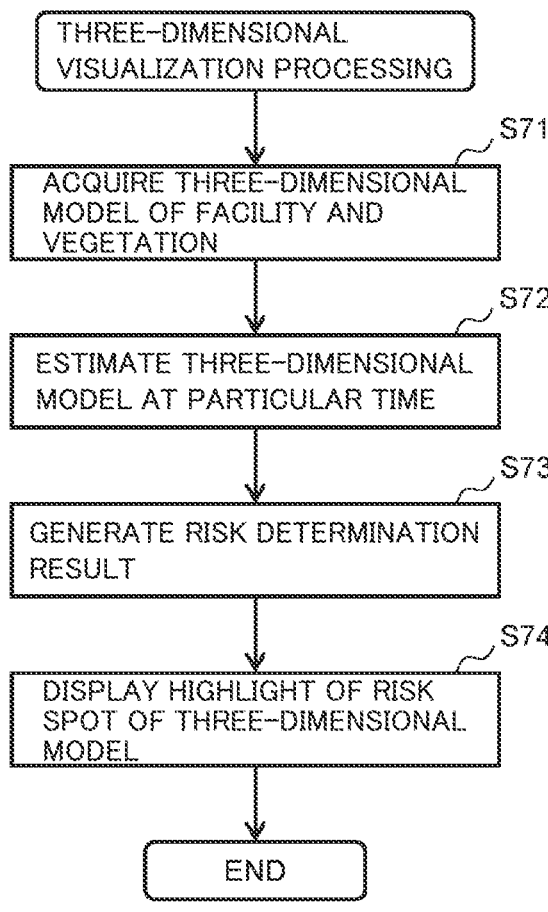
FIG. 17 is a flowchart illustrating a processing procedure example of three-dimensional visualization processing.

FIG. 17 is a flowchart illustrating a processing procedure example of the three-dimensional visualization processing. As described above, the three-dimensional visualization processing is one of the visualization processing of Step S8 in FIG. 3 and is mainly executed by visualization unit 18.

According to FIG. 15, first, visualization unit 18 acquires the three-dimensional model of the power facility and the vegetation from database 20 and inputs the three-dimensional model in visualization unit 18 (Step S71).

Next, visualization unit 18 estimates how the vegetation amount changes in the three-dimensional model acquired in Step S71 in the target region at a designated time (or in a designated time interval) with use of the time-series vegetation amount that is a simulation result of the vegetation amount by the vegetation amount prediction processing (Step S72). By the processing in Step S72, a vegetation amount estimation three-dimensional model at a particular time is generated.

Next, visualization unit 18 performs contact risk determination that evaluates the contact risk between the vegetation and the power facility at a designated time (or in a designated time interval) on the basis of the three-dimensional model generated in Step S72 and generates the risk determination result (Step S73). In the processing of Steps S71 to S63, risk determination unit 17 may be caused to perform estimation of the vegetation amount estimation three-dimensional model at a particular time and the contact risk determination of the detailed judgement after being given a designated time, and visualization unit 18 may acquire the determination result.

Lastly, visualization unit 18 displays the risk determination result obtained in Step S73 by a three-dimensional model expressing the target region at a designated time (Step S74). More specifically, for example, a highlight of a contact situation and a contact spot (risk spot) in which the vegetation and the power facility may come into contact with each other at a designated time is displayed on the three-dimensional model. When a time interval is designated by the user as a designated time, a state in which the contact situation and the risk spot fluctuate with the elapse of time in the designated time interval is displayed by a moving image.

Figure 18:
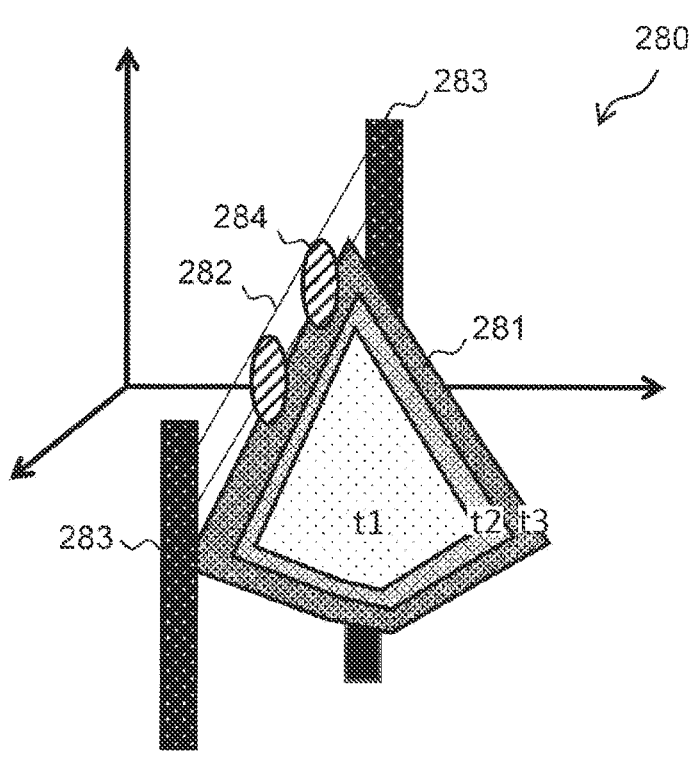
FIG. 18 is a view describing an image of three-dimensional visualization.

FIG. 18 is a view describing an image of three-dimensional visualization. In FIG. 18, when a particular time (designated time) designated by the user is time t1, t2, t3, a three-dimensional model 280 to be displayed by the three-dimensional visualization processing for each time is exemplified altogether. Specifically, in three-dimensional model 280, a tree crown 281 is expressed as one example of a simulation result of the vegetation at each designated time, and power transmission lines 282 and power poles 283 are expressed as one example of the power facility. Out of the above, in time t3, risk spots 284 are displayed as an example of a case where it is determined by the contact risk determination that there is a possibility of tree crown 281 and power transmission lines 282 coming into contact with each other. As a result, the contact situation and the contact place are indicated in an easily understood manner. When the time interval from t1 to t3 is designated by the user, a moving image indicating a fluctuation in the contact situation and the risk spot in the designated time interval (temporal resolution) only needs to be displayed.

By performing the three-dimensional visualization processing as above, visualization unit 18 can display the determination result of the contact risk determination of the detailed judgement at a designated time to the user in an easily understood manner. As a derivative example in this embodiment, the displaying of the determination result of the contact risk determination of the wide-area judgement at a designated time may also be performed by the three-dimensional visualization processing in FIG. 17 and not by the two-dimensional visualization processing in FIG. 15. However, when a three-dimensional model is processed, the processing load increases as compared to a case where a two-dimensional map is processed. Therefore, the analyzing cost increases.

Figure 19:
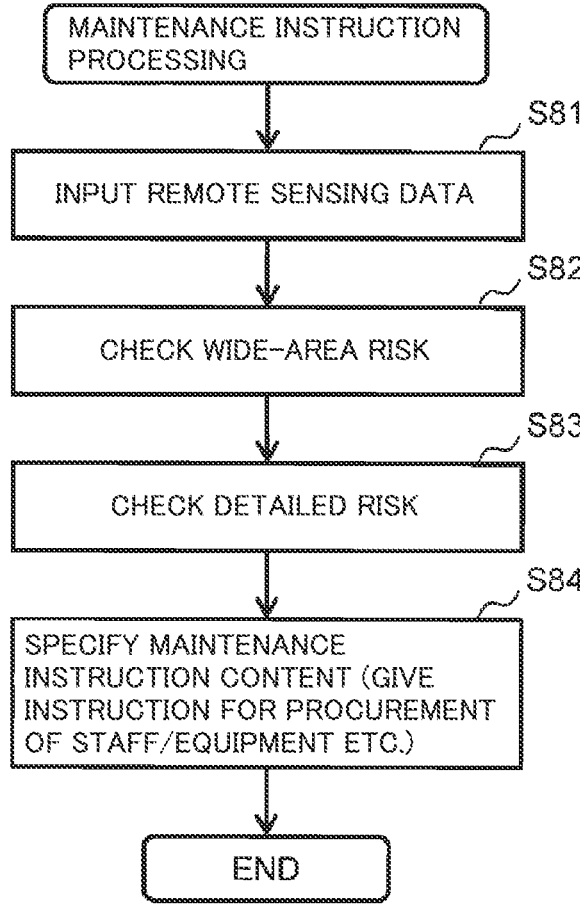
FIG. 19 is a flowchart illustrating a processing procedure example of maintenance instruction processing.

FIG. 19 is a flowchart illustrating a processing procedure example of the maintenance instruction processing. As described above, the maintenance instruction processing is equivalent to the processing of Step S9 in FIG. 3 and is executed by maintenance instruction unit 19.

According to FIG. 19, first, maintenance instruction unit 19 acquires the remote sensing data from database 20 and inputs the remote sensing data in maintenance instruction unit 19 (Step S81). Examples of the remote sensing data acquired in Step S81 can include a satellite image, a drone image, and an in-vehicle camera image, but the remote sensing data may be other data.

Next, maintenance instruction unit 19 checks the determination result of the contact risk determination using the remote sensing data acquired in Step S81 (Steps S82, S83).

In detail, in Step S82, maintenance instruction unit 19 checks a wide-area contact risk. Specifically, maintenance instruction unit 19 checks a wide-area risk spot (for example, risk spot 253 in FIG. 14(A)) calculated by the contact risk determination of the wide-area judgement in the risk determination processing (see FIG. 13), and a wide-area risk situation (for example, a situation of a place around risk spot 273 at time t3 in FIG. 16) visualized by the two-dimensional visualization processing (see FIG. 15), and chooses a region of interest in which a wide-area contact risk between the power facility and the vegetation is predicted. The region of interest only needs to be chosen using a threshold value on the basis of quantification of a risk value, but methods other than the method may be used.

Then, in Step S83, maintenance instruction unit 19 checks a detailed contact risk for the region of interest chosen in Step S82. Specifically, maintenance instruction unit 19 checks a detailed risk spot (for example, the contact spot with respect to the power pole due to lodging in FIG. 14(B)) calculated in the contact risk determination of the detailed judgement in the risk determination processing (see FIG. 13), and the detailed risk situation (for example, the situation of places around risk spots 284 at time t3 in FIG. 18) visualized by the three-dimensional visualization processing (see FIG. 17), and identifies a detailed region in which a contact risk is predicted between the power facility and the vegetation. The identification of the detailed region only needs to perform specification using a threshold value on the basis of the quantification of a risk value, but methods other than the method may be used.

Then, after the processing of Steps S82, S83, maintenance instruction unit 19 acquires, on the basis of the risk determination result checked in Steps S82, S83 and the detailed region identified in Step S83, management data corresponding to the risk determination result and the detailed region from database 20 and specifies instruction content of maintenance work to be needed (Step S84). In the instruction content of the maintenance work specified in Step S84, the identification of the maintenance place, the optimization of vehicle allocation, a duty-trip plan for staff, and the transportation of equipment, for example, can be included. The method of specifying the instruction content of the maintenance work is not limited to a particular method, but only needs to list the identified risk places (detailed regions) and optimize the route and time for staff dispatch and equipment conveyance in accordance with the maintenance work from the registered content of the list, for example. In Step S84, maintenance instruction unit 19 outputs the specified instruction content of the maintenance work to a predetermined output apparatus (for example, a liquid crystal display or a printer). A specific image of the maintenance work instruction is exemplified in FIG. 20.

Figure 20:
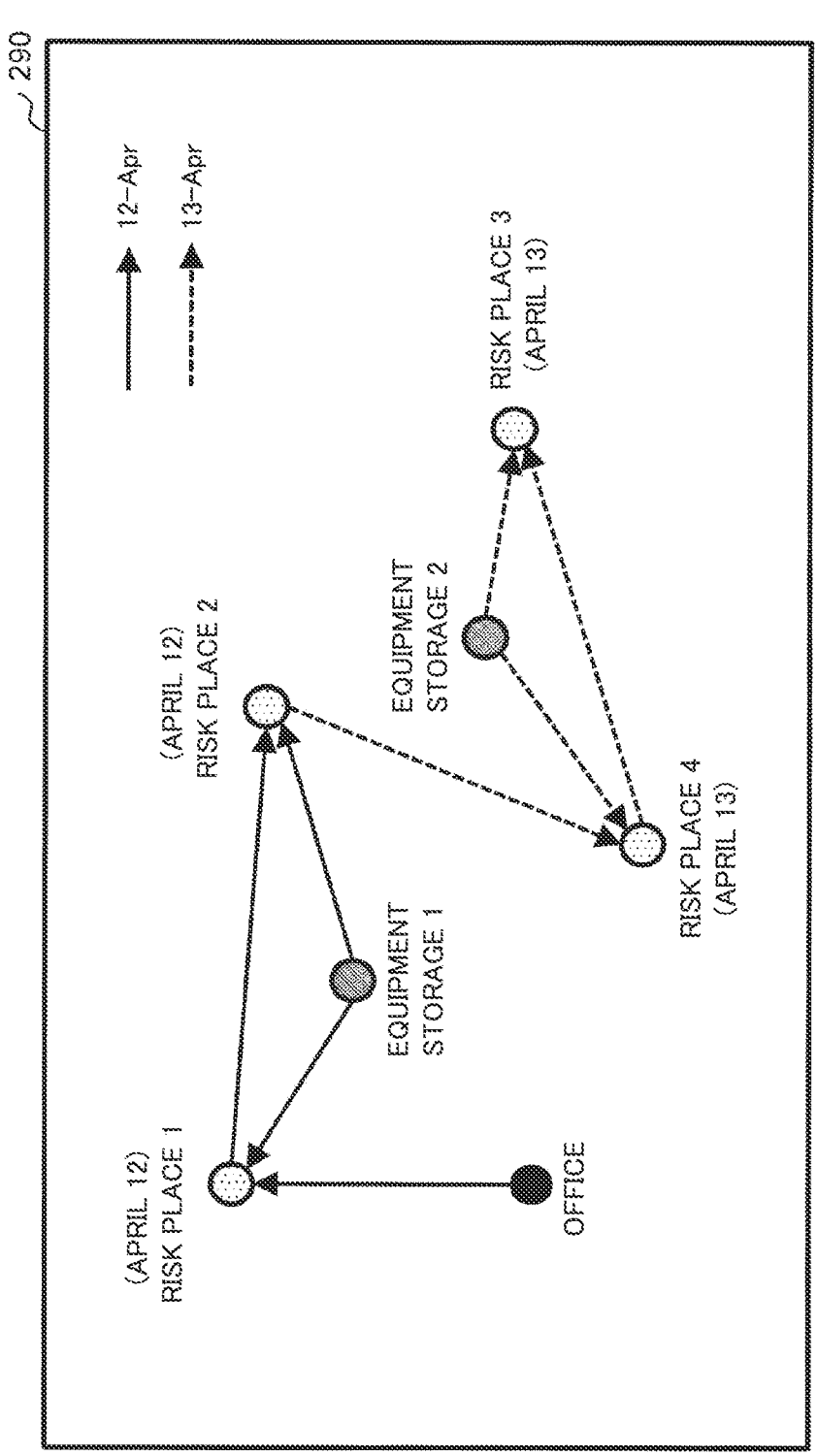
FIG. 20 is a view showing a display output example of a maintenance instruction.

FIG. 20 is a view showing a display output example of the maintenance instruction. A maintenance instruction screen 290 shown in FIG. 20 is an output example of instruction content of maintenance work output in Step S84 in FIG. 19 and is a display screen displayed on a display apparatus (not shown) of vegetation management system 1.

In maintenance instruction screen 290 in FIG. 20, an office, two equipment storages (equipment storages 1 and 2), and four risk places (risk places 1 to 4) are indicated. Maintenance instruction unit 19 searches an optimal route of the staff dispatch and the equipment transportation by using the positions of the office and the equipment storages with respect to each risk place as a reference when the instruction content of the maintenance work is specified (Step S84 in FIG. 19). Maintenance instruction unit 19 estimates the maintenance time in each risk place by performing calculation considering the travel time and the maintenance work time and displays the maintenance time on maintenance instruction screen 290 together with the instruction for the route and time. Specifically, in the case of maintenance instruction screen 290 in FIG. 20, the schedule for traveling to each risk place and performing maintenance work is planned on April 12 or April 13, and routes for staff dispatch and equipment conveyance are indicated by directional lines. The instruction content of the maintenance work as above differs depending on the number and the positions of the risk places, the positions of the office and the storages, and the like.

In the output of the instruction content of the maintenance work, visualized display of the risk spots and the contact situation for each risk place may be performed with use of the processing result of the two-dimensional visualization processing or the three-dimensional visualization processing.

As described with reference to each drawing above, according to vegetation management system 1 according to this embodiment, the discrimination of the type of the vegetation (vegetation classification), the growth prediction of the vegetation in the wide-area range (wide-area vegetation growth prediction), the prediction of a time-series fluctuation in the vegetation growth for each vegetation by growth simulation (time-series vegetation amount prediction), the generation of a three-dimensional model of the vegetation and the facility (three-dimensional model construction), and the like can be executed by utilizing the remote sensing data in which a wide area can be remotely photographed, and the risk of the vegetation and the facility (for example, the power facility) coming into contact with each other can be determined on the basis of those execution results. Therefore, an effect of realizing the analysis of the contact risk for a wide-area range can be accurately obtained at a low cost even when a facility is installed in a place that is difficult for people to enter such as mountainous regions. In particular, when a three-dimensional model of the vegetation amount is generated, an effect of suppressing the cost can be expected much more by performing prediction by performing growth simulation as compared to a case where the three-dimensional model is generated with use of remote sensing data in which the vegetation is actually photographed.

According to vegetation management system 1 according to this embodiment, in the determination of the contact risk between the vegetation and the facility, detailed judgement is performed for a wide-area risk spot after the risk spot is identified by the wide-area judgement. Therefore, a more accurate evaluation can be performed for the place in which a contact risk exists and the contact situation thereof. The wide-area judgement can suppress the overall cost by using a two-dimensional model (two-dimensional map) that is relatively low in cost and not using a three-dimensional model that is relatively high in cost.

According to vegetation management system 1 according to this embodiment, the determination result of the contact risk obtained by the wide-area judgement and the detailed judgement can be visualized in a two-dimensional or three-dimensional manner. Therefore, the contact situation of the place with a contact risk can be visually judged in an easy manner.

According to vegetation management system 1 according to this embodiment, the work content of the maintenance work to be needed can be specified on the basis of the determination result of the contact risk obtained by the wide-area judgement and the detailed judgement, and the instruction for the maintenance work can be output. Therefore, an accurate instruction for the maintenance work at a low cost can be realized. When the work content of the maintenance work is specified, information relating to a plurality of risk places is collected and comprehensive judgement is performed. Therefore, the route for introducing staff and equipment can be optimized, and a more efficient instruction for the maintenance work can be realized.

The present invention is not limited to the examples described above, and various modifications are included. For example, the example described above describes the present invention in detail in order to describe the present invention in an easily understood manner and is not necessarily limited to including all of the described configurations. A part of a configuration of one example can be replaced by a configuration of another example. A configuration of one example can be added to a configuration of another example. In a part of a configuration of an example, the addition, deletion, replacement of another configuration can be performed.

In each of the configurations, functions, processing units, processing means, and the like described above, some or all of the above may be realized by hardware by designing the above with an integrated circuit, for example. Each of the configurations, the functions, and the like described above may be realized by software by interpreting and executing a program for realizing each of the functions by a processor. Information such as a program, a table, a file, and the like for realizing each of the functions can be placed in recording apparatuses such as a memory, a hard disk drive, and a solid state drive (SSD) or recording media such as an integrated circuit (IC) card, an SD card, and a digital versatile disc (DVD).

In the drawings, control lines and information lines that are conceived to be necessary in terms of description are illustrated, and not all control lines and information lines are necessarily illustrated in terms of a product. In actuality, it can be conceived that almost all of the configurations are connected to each other.

REFERENCE SIGNS LIST

1 Vegetation management system
1a CPU
1b RAM
1c Storage apparatus
2 Remote sensing observation apparatus
10 Input data
10a Remote sensing image data
10b Spectral library data
10c Geographical information data
10d Environment information data
10e Management information data
11 Data acquisition unit
11a Remote sensing image data acquisition unit
11b Geographical information data acquisition unit
11c Environment information data acquisition unit
11d Management information data acquisition unit
12 Database generation unit
13 Vegetation classification unit
14 Wide-area growth prediction unit
15 Vegetation amount simulation unit
16 Three-dimensional construction unit
17 Risk determination unit
18 Visualization unit
19 Maintenance instruction unit
20 Database
201 Remote sensing data
202 Spectral library
203 Geographical data
204 Environmental data
205 Management data
211 Pre-classification map image
212 Vegetation classification map image 220, 270 Two-dimensional map
221, 251, 271 Vegetation range
231, 281 Tree crown
240, 280 Three-dimensional model
241, 252, 272, 282 Power transmission line
242, 262 Vegetation
250, 260 Risk determination model
253, 273, 284 Risk spot
261 Power facility
283 Power pole
290 Maintenance instruction screen

The invention claimed is:

1. A vegetation management system that analyzes, with use of remote sensing data obtained by photographing a facility and a vegetation to be analyzed by remote sensing, a contact of the vegetation with respect to the facility, the vegetation management system comprising:
at least one hardware processor; and
software that, when executed by the at least one hardware processor;
acquires input data including at least the remote sensing data, geographical data of the facility, and environmental data relating to a growth of the vegetation;
classifies the vegetation photographed in the remote sensing data into a type of vegetation, from among a plurality of types of vegetation, based on a spectral library of different types of vegetation;
predicts a time-series change of a growth range of the vegetation photographed in the remote sensing data;
predicts, by a simulation, a fluctuation in a growth amount of each classified vegetation;
constructs a three-dimensional model expressing the facility and the vegetation on basis of the remote sensing data and the geographical data; and
determines a contact risk indicating a contact possibility between the facility and the vegetation on basis of the predicted time-series change of the growth range of the vegetation, the predicted fluctuation in the growth amount of each vegetation, and the three-dimensional model.

2. The vegetation management system according to claim 1, wherein the software, when executed by the at least one hardware processor, further:
generates a visualization model that visualizes a positional relationship and the contact risk between the facility and the vegetation; and
specifies a maintenance work necessary for eliminating the contact risk on basis of the contact risk and the visualization model, and outputs content of the specified maintenance work.

3. The vegetation management system according to claim 1, wherein the determination of the contact risk comprises gradually executing:
wide-area judgement that evaluates the contact risk between the facility and the vegetation in a relatively wide-area range with use of the predicted time-series change of the growth range of the vegetation; and
detailed judgement that evaluates, with use of the predicted fluctuation in the growth amount of each vegetation, the contact risk between the facility and the vegetation only in a place in which it is evaluated that the contact risk exists in the wide-area judgement.

4. The vegetation management system according to claim 3, wherein the wide-area judgement uses a two-dimensional risk determination model in which the predicted time-series change of the growth range of the vegetation is reflected in a two-dimensional map obtained by importing the geographical data of the facility into the remote sensing data.

5. The vegetation management system according to claim 3, wherein the detailed judgement uses a three-dimensional risk determination model in which the predicted fluctuation in the growth amount of each vegetation is reflected in the three-dimensional model.

6. The vegetation management system according to claim 1, wherein the software, when executed by the at least one hardware processor, simulates the fluctuation in the growth amount of each vegetation with use of the environmental data, a growth model for each vegetation held in advance, and a classification result of the vegetation.

7. The vegetation management system according to claim 2, further comprising a database that stores therein various input data, intermediate data, and output data input or generated in the vegetation management system.

8. A vegetation management method by a vegetation management system that analyzes, with use of remote sensing data obtained by photographing a facility and a vegetation to be analyzed by remote sensing, a contact of the vegetation with respect to the facility, the vegetation management method comprising:

a data acquisition step of acquiring input data including at least the remote sensing data, geographical data of the facility, and environmental data relating to a growth of the vegetation;

a vegetation classification step of classifying the vegetation photographed in the remote sensing data into a type of vegetation, from among a plurality of types of vegetation, based on a spectral library of different types of vegetation;

a wide-area growth prediction step of predicting a time-series change of a growth range of the vegetation photographed in the remote sensing data;

a vegetation amount simulation step of predicting, by a simulation, a fluctuation in a growth amount of each vegetation classified in the vegetation classification step;

a three-dimensional construction step of constructing a three-dimensional model expressing the facility and the vegetation on basis of the remote sensing data and the geographical data; and a risk determination step of determining a contact risk indicating a contact possibility between the facility and the vegetation on basis of a processing result obtained in the wide-area growth prediction step, the vegetation amount simulation step, and the three-dimensional construction step.

9. The vegetation management method according to claim 8, further comprising:

a visualization step of generating a visualization model that visualizes a positional relationship and a contact risk between the facility and the vegetation; and a maintenance instruction step of specifying a maintenance work necessary for eliminating the contact risk on basis of a determination result of the contact risk obtained in the risk determination step and the visualization model generated in the visualization step and outputting content of the specified maintenance work.

10. The vegetation management method according to claim 8, wherein the risk determination step includes gradually executing:

wide-area judgement that evaluates the contact risk between the facility and the vegetation in a relatively wide-area range with use of a prediction result of the time-series change of the growth range of the vegetation obtained in the wide-area growth prediction step; and detailed judgement that evaluates, with use of a prediction result of the fluctuation in the growth amount of each vegetation obtained in the vegetation amount simulation step, the contact risk between the facility and the vegetation in a place in which it is evaluated that the contact risk exists in the wide-area judgement.

11. The vegetation management method according to claim 10, wherein the wide-area judgement uses a two-dimensional risk determination model in which the prediction result of the time-series change of the growth range of the vegetation obtained in the wide-area growth prediction step is reflected in a two-dimensional map obtained by importing the geographical data of the facility into the remote sensing data.

12. The vegetation management method according to claim 10, wherein the detailed judgement uses a three-dimensional risk determination model in which the prediction result of the fluctuation in the growth amount of each vegetation obtained in the vegetation amount simulation step is reflected in the three-dimensional model constructed in the three-dimensional construction step.

13. The vegetation management method according to claim 8, wherein the vegetation amount simulation step simulates the fluctuation in the growth amount of each vegetation with use of the environmental data, a growth model for each vegetation held in advance, and a classification result of the vegetation obtained in the vegetation classification step.

14. The vegetation management method according to claim 9, further comprising a storing step of storing various input data, intermediate data, and output data input or generated in the vegetation management system in a database of the vegetation management system.

15. A method comprising using at least one computer processor to:

acquire input data that include at least remote sensing data, geographical data of a facility, and environmental data relating to a growth of vegetation, the remote sensing data obtained by photographing the facility and the vegetation;

classify the vegetation photographed in the remote sensing data into a type of vegetation, from among a plurality of types of vegetation, based on a spectral library of different types of vegetation;

predict a time-series change of a growth range of the vegetation photographed in the remote sensing data;

predict, by a simulation, a fluctuation in a growth amount of the classified vegetation;

construct a three-dimensional model that expresses the facility and the vegetation based on the remote sensing data and the geographical data; and determine a contact risk, indicating a contact possibility between the facility and the vegetation, based on the predicted time-series change of the growth rate of the vegetation, the predicted fluctuation in the growth amount of the classified vegetation, and the constructed three-dimensional model.

16. The method according to claim 15, further comprising using the at least one computer processor to:

generate a visualization model that visualizes a positional relationship and the contact risk between the facility and the vegetation; and specify maintenance work for eliminating the contact risk based on the contact risk and the visualization model; and output content of the specified maintenance work.

17. The method according to claim 15, wherein determining the contact risk comprises gradually executing:

wide-area judgement that evaluates the contact risk between the facility and the vegetation in a relatively wide-area range, using the predicted time-series change of the growth range of the vegetation; and detailed judgement that evaluates the contact risk between the facility and the vegetation in a place in which the wide-area judgement determines that the contact risk exists, using the predicted fluctuation in the growth amount of the classified vegetation.

18. The method according to claim 17, wherein the wide-area judgement uses a two-dimensional risk determination model in which the predicted time-series change of the growth range of the vegetation is reflected in a two-dimensional map obtained by importing the geographical data of the facility into the remote sensing data.

19. The method according to claim 17, wherein the detailed judgement uses a three-dimensional risk determination model in which the predicted fluctuation in the growth amount of the classified vegetation is reflected in the constructed three-dimensional model.

20. The method according to claim 15, wherein the fluctuation in the growth amount of the classified vegetation is simulated using the environmental data, a growth model for each vegetation held in advance, and a classification result of the vegetation.

\* \* \* \* \*